US012431264B2

(12) United States Patent
Sullivan et al.

(10) Patent No.: US 12,431,264 B2
(45) Date of Patent: Sep. 30, 2025

(54) MULTI-LAYERED, SHIELDED AND GROUNDED CABLES AND RELATED METHODS

(71) Applicant: Molex, LLC, Lisle, IL (US)

(72) Inventors: Jared D. Sullivan, Sherwood, AR (US); Michael Mcgee, Maumelle, AR (US); Eran J. Jones, Conway, AR (US); David Gader, Cumberland, RI (US); Andrew J. Wehrli, Maumelle, AR (US); Todd D. Ward, Maumelle, AR (US); Gianni R. Bardella, Maumelle, AR (US); Ayman Isaac, Glendale, AZ (US); Darian Schulz, Little Rock, AR (US)

(73) Assignee: Molex, LLC, Lisle, IL (US)

( * ) Notice: Subject to any disclaimer, the term of this patent is extended or adjusted under 35 U.S.C. 154(b) by 581 days.

(21) Appl. No.: 17/883,653

(22) Filed: Aug. 9, 2022

(65) Prior Publication Data

US 2022/0384069 A1 Dec. 1, 2022

Related U.S. Application Data

(62) Division of application No. 17/148,603, filed on Jan. 14, 2021, now Pat. No. 11,735,338.

(60) Provisional application No. 62/960,707, filed on Jan. 14, 2020, provisional application No. 62/960,711, filed on Jan. 14, 2020.

(51) Int. Cl.

*H01R 13/6592* (2011.01)
*H01B 11/10* (2006.01)
*H01R 13/6591* (2011.01)
*H01R 13/6598* (2011.01)

(52) U.S. Cl.

CPC ..... *H01B 11/1058* (2013.01); *H01B 11/1091* (2013.01); *H01R 13/65915* (2020.08); *H01R 13/6598* (2013.01)

(58) Field of Classification Search

CPC ...................... H01R 13/06501; H01R 13/6598
See application file for complete search history.

(56) References Cited

U.S. PATENT DOCUMENTS

| | | | | |
|---|---|---|---|---|
| 4,406,914 | A | 9/1983 | Kincaid | |
| 5,198,290 | A | 3/1993 | Niioka | |
| 6,380,485 | B1 * | 4/2002 | Beaman | H01R 13/6589 439/497 |
| 9,490,588 | B2 * | 11/2016 | Keyser | H01R 12/53 |
| 9,496,071 | B2 | 11/2016 | Nagahashi | |

(Continued)

FOREIGN PATENT DOCUMENTS

| | | | |
|---|---|---|---|
| CN | 101707076 | A | 5/2010 |
| CN | 203276924 | U | 11/2013 |

(Continued)

OTHER PUBLICATIONS

Final office action received for U.S. Appl. No. 17/148,603, mailed on May 10, 2022, 18 pages.

(Continued)

*Primary Examiner* — Neil Abrams

(57) ABSTRACT

Data/telecommunication cables that include one or more layers of an integral, bonded electromagnetic shield are described. The shield may be configured to form an electrical ground path.

18 Claims, 22 Drawing Sheets

(56) References Cited

U.S. PATENT DOCUMENTS

| | | | |
|---|---|---|---|
| 9,728,304 | B2 | 8/2017 | Visser |
| 9,774,113 | B2 * | 9/2017 | Zhang .................... H01R 12/62 |
| 10,411,374 | B2 * | 9/2019 | Tanaka ................... H01R 12/53 |
| 10,741,941 | B2 * | 8/2020 | Wu .................... H01R 43/0256 |
| 2005/0042960 | A1 | 2/2005 | Yeh et al. |
| 2006/0054334 | A1 | 3/2006 | Vaupotic et al. |
| 2010/0212934 | A1 | 8/2010 | Sexton |
| 2011/0253416 | A1 | 10/2011 | Amato |
| 2012/0000692 | A1 | 1/2012 | Tsuchiya |
| 2014/0209347 | A1 | 7/2014 | Buck et al. |
| 2016/0072230 | A1 | 3/2016 | De France et al. |
| 2017/0271860 | A1 | 9/2017 | Mashio |
| 2018/0075948 | A1 | 3/2018 | Kobayashi |
| 2019/0140374 | A1 | 5/2019 | Wu et al. |
| 2019/0348196 | A1 | 11/2019 | Hornung et al. |

FOREIGN PATENT DOCUMENTS

| | | | |
|---|---|---|---|
| CN | 203466377 | U | 3/2014 |
| CN | 203573733 | U | 4/2014 |
| CN | 203760766 | U | 8/2014 |
| CN | 109979673 | A | 7/2019 |
| EP | 1267362 | A1 | 12/2002 |
| JP | S60254583 | A | 12/1985 |
| KR | 20090094775 | A | 9/2009 |
| TW | 201316627 | A | 4/2013 |
| TW | M492554 | U | 12/2014 |
| WO | 2006127723 | A2 | 11/2006 |

OTHER PUBLICATIONS

Non-final office action received for U.S. Appl. No. 17/148,603, mailed on Nov. 2, 2021, 12 pages.

International Preliminary Report on Patentability and written opinion received for PCT application No. PCT/IB2021/050245, mailed on Jul. 28, 2022, 9 pages.

International Search Report and Written Opinion received for PCT Application No. PCT/IB2021/050245, mailed on Jun. 9, 2021, 14 Pages.

* cited by examiner

MULTI-LAYERED, SHIELDED AND GROUNDED CABLES AND RELATED METHODS

RELATED APPLICATIONS

This application is a divisional of U.S. patent application Ser. No. 17/148,603 filed on Jan. 14, 2021, which claims the benefit of priority from U.S. Provisional Application No. 62/960,707 filed Jan. 14, 2020, and from U.S. Provisional Application No. 62/960,711 filed Jan. 14, 2020, and all of which are incorporated herein by reference in their entireties.

FIELD OF THE INVENTION

This disclosure relates to the field of electrical cabling, more specifically to the shielding of signal conductors that are a part of cable assemblies.

INTRODUCTION

This section introduces aspects that may be helpful to facilitate a better understanding of the described invention(s). Accordingly, the statements in this section are to be read in this light and are not to be understood as admissions about what is, or what is not, in the prior art.

It is a challenge to electrically ground data/telecommunication cables while at the same time shielding them from unwanted electromagnetic interference. Typically, to ground a shielded cable one or more separate electrical “drain” wires are included in the cable. However, such a design has its drawbacks.

Accordingly, it is desirable to provide inventive cables and related methods that provide solutions to the drawbacks of existing grounded and shielded cables.

SUMMARY

The inventors describe various exemplary, inventive shielded and grounded cables and related methods.

One embodiment of an inventive multi-layered, shielded and grounded data/telecommunications cable may comprise: an outer insulating layer; an electromagnetic shield comprising at least (i) one or more outer conductive shield layers, (ii) one or more inner insulating layers and (iii) one or more inner conductive shield layers, wherein the one or more outer and inner conductive shield layers are configured to form an electrical ground return path; one or more core conductors; and insulation surrounding the one or more core conductors, for example. The inventive cable may comprise a twinax cable, for example. The composition of the one or more outer conductive layers may comprise a dissimilar metal than the material composition of the one or more inner conductive layers. The one or more outer conductive layers and one or more inner conductive layers may be configured to make direct galvanic contact over an overlapped portion of the shield (described further herein) to form the ground return path.

In more detail, the outer insulating layer and one or more inner insulating layers may be composed of a Mylar or polyethylene terephthalate material, the one or more outer conductive shield layers may be composed of a copper material and may have a thickness of 9 μm, and the one or more inner conductive shield layers may be composed of an aluminum material which may also have a thickness of 9 μm, for example.

In embodiments, the outer insulating layer may comprise two layers, where each layer may have a thickness of 12 μm, or, alternatively, the outer insulating layer may comprise a single layer having a thickness of 12 μm.

It should be understood that the electromagnetic shield may comprise an integral, bonded component, and may be configured longitudinally or helically around the insulation of the inventive cable.

In further embodiments, the electromagnetic shield may be configured around the insulation at an angle of more than 360 degrees, wherein a portion of the shield that is configured more than 360 degrees (“overlapped portion”) is configured to provide a direct electrical connection between the inner conductive layer and outer conductive layer.

The overlapped portion may comprise a length equal to 20% to 70% of a circumference of the electromagnetic shield measured at 360 degrees, for example. For example, in one such embodiment the overlapped portion may comprise a length that is 50% of a circumference of the electromagnetic shield measured at 360 degrees.

The outer insulating layer may further comprise an adhesive layer configured as a plurality of diamond-shaped sections, where each of the sections may have an area 0.7 mm square and adhesive layer may be configured with a gap of 0.4 mm between each section. The adhesive layer may be composed of an ethylene acrylic acid copolymer, for example, and may have a thickness of 3 μm, for example.

In addition to the inventive cables described herein, the present inventors also discovered inventive methods for grounding and shielding a data/telecommunication cable (e.g., a twinax cable). One such embodiment may comprise: applying insulation around one or more core conductors; applying an electromagnetic shield around the insulation, wherein the shield comprises at least (i) one or more outer conductive shield layers, (ii) one or more inner insulating layers and (iii) one or more inner conductive shield layers, wherein the one or more outer and inner conductive shield layers are configured to form an electrical ground return path; and applying an outer insulating layer around the electromagnetic shield, for example. Said another way, the one or more outer conductive layers and one or more inner conductive layers may be configured and applied to make direct galvanic contact over an overlapped portion of the shield (described further herein) to form the ground return path.

The composition of the one or more outer conductive layers of the cable may comprise a dissimilar metal than the material composition of the one or more inner conductive layers.

As described previously, (a) the outer insulating layer and one or more inner insulating layers of the cable may be composed of a Mylar or polyethylene terephthalate material, (b) the one or more outer conductive shield layers of the cable may be composed of a copper material and may have a thickness of 9 μm, and (c) the one or more inner conductive shield layers of the cable may be composed of an aluminum material and may also have a thickness of 9 μm, for example. In embodiments, the outer insulating layer of the cable may comprise two layers, where each layer may have a thickness of 12 μm, or, alternatively, the outer insulating layer may comprise a single layer having a thickness of 12 μm.

The inventive method may further comprise forming the electromagnetic shield as an integral, bonded component. Yet further, the inventive method may additional comprise applying the electromagnetic shield longitudinally or helically around the insulation of the cable.

Still further, the inventive method may comprise applying the electromagnetic shield around the insulation at an angle of more than 360 degrees, wherein a portion of the shield that is applied more than 360 degrees (i.e., the overlapped portion) provides a direct electrical connection between the inner conductive layer and outer conductive layer. In embodiments, the overlapped portion may comprise a length equal to 20% to 70% of a circumference of the electromagnetic shield measured at 360 degrees. For example, the overlapped portion may comprise a length that is 50% of a circumference of the electromagnetic shield measured at 360 degrees, for example.

In an embodiment, the applied outer insulating layer may further comprise an adhesive layer (e.g., an ethylene acrylic acid copolymer) and may have a thickness of 3 μm. The adhesive layer maybe configured as a plurality of diamond-shaped sections, where each of the diamond-shaped sections may have an area 0.7 mm square, for example. The adhesive layer may be configured with a gap of 0.4 mm between each section, for example.

In yet additional embodiments, the inventors provide methods for connecting a grounded and shielded data/telecommunication cable. One such inventive method may comprise: exposing an outer shield, conductive layer of a multi-layered, electromagnetic shield of the cable by removing an outer insulating layer of the cable, wherein the cable comprises at least the outer insulating layer, the shield, insulation and one or more conductors; and connecting the exposed, outer shield conductive layer to another cable, printed circuit board (PCB), connector or electronic device. The outer shield conductive layer may be exposed by various inventive methods, one of which may comprise removing an entire circumference of an end section of the outer insulating layer of the cable, while another may comprise removing an entire circumference of a middle section of the outer insulating layer of the cable, to name two such examples.

The inventive method may further comprise connecting the cable by soldering the outer shield conductive layer to another cable, PCB, connector or electronic device, for example. In more detail, the inventive method may comprise applying solder to the exposed outer shield conductive layer to connect the cable to a ground conductive element, and receiving and holding the solder within a top, open connecting section of the ground conductive element.

Another exemplary method for connecting a grounded and shielded data/telecommunication cable may comprise, for example: exposing an outer shield layer of a multi-layered, electromagnetic shield of the cable by removing an outer insulating layer of the cable, wherein the cable comprises at least the outer insulating layer, the shield, insulation and one or more conductors; and connecting the exposed, outer shield layer to a ground conductive strap by receiving and holding solder within a top section of the conductive strap, wherein the solder connects the strap and exposed, outer shield layer.

In embodiments, the strap may be composed of a formable conductive metal or alloy (e.g., a copper-based metal or alloy) and may have a thickness of 0.20 mm, +1-1 mm, for example. Further, a surface of the strap may comprise a tin matte layer that may have a thickness of 0.76 μm over a nickel layer that may have a thickness of 1.0 μm, for example.

The inventive method may further comprise connecting the strap to a printed circuit board.

In yet another embodiment, the inventors provide an inventive assembly. For example, one such inventive assembly may comprise: a PCB; at least one cable comprising at least one signal conductor and at least one ground conductor, and a connective structure mounted to the PCB and to the at least one ground conductor that terminates on the connective structure at a termination area, where the connective structure provides at least two substantially symmetric paths from the termination area of the ground conductor to the PCB. Further, the connective structure may be configured around an end of the at least one cable.

Still further, the connective structure may further comprise at least two legs, each leg forming one of the substantially symmetrical paths.

A further description of these and additional embodiments is provided by way of the figures, notes contained in the figures and in the claim language included below. The claim language included below is incorporated herein by reference in expanded form, that is, hierarchically from broadest to narrowest, with each possible combination indicated by the multiple dependent claim references described as a unique standalone embodiment.

BRIEF DESCRIPTION OF THE DRAWINGS

The present invention is illustrated by way of example and not limited in the accompanying figures in which like reference numerals indicate similar elements and in which:

FIGS. 8A and 8B depict an exemplary, inventive assembly according to an embodiment of the invention while

FIGS. 10A and 10B depict views of exemplary connections between inventive cables and a printed circuit board (PCB) while

Figure 1A:
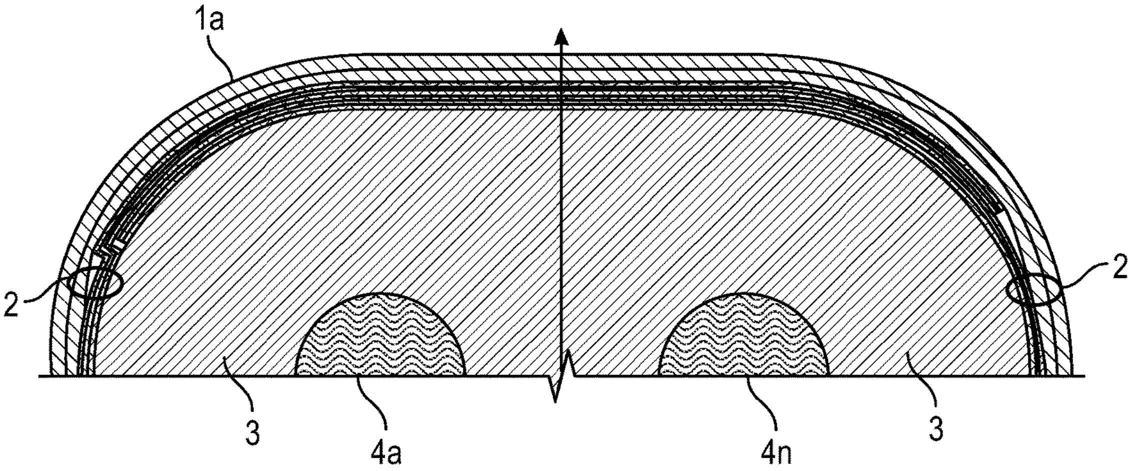
FIGS. 1A and 1B depict different views of an exemplary, inventive cable according to an embodiment of the invention.

Specific embodiments of the present invention are disclosed below with reference to various figures and sketches. Both the description and the illustrations have been drafted with the intent to enhance understanding. For example, the dimensions of some of the elements in the figures may be exaggerated relative to other elements, and well-known elements that are beneficial or even necessary to a commercially successful implementation may not be depicted so that a less obstructed and a more clear presentation of embodiments may be achieved. Further, dimensions and other parameters described herein are merely exemplary and non-limiting.

DETAILED DESCRIPTION OF THE PREFERRED EMBODIMENTS

Simplicity and clarity in both illustration and description are sought to effectively enable a person of skill in the art to make, use, and best practice the present invention in view of what is already known in the art. One skilled in the art will appreciate that various modifications and changes may be made to the specific embodiments described herein without departing from the spirit and scope of the present invention. Thus, the specification and drawings are to be regarded as illustrative and exemplary rather than restrictive or all-encompassing, and all such modifications to the specific embodiments described herein are intended to be included within the scope of the present invention. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

Relatedly, to the extent that any of the figures or text included herein depicts or describes dimensions or operating parameters it should be understood that such information is merely exemplary and is provided to enable one skilled in the art to make and use an exemplary embodiment of the invention without departing from the scope of the invention.

As used herein and in the appended claims, the terms "comprises," "comprising" or any other variation thereof is intended to refer to a non-exclusive inclusion, such that a process, method, article of manufacture, device or apparatus (e.g., a connector) that comprises a list of elements does not include only those elements in the list, but may include other elements not expressly listed or inherent to such process, method, article of manufacture, device or apparatus. The terms "a" or "an", as used herein, are defined as one, or more than one. The term "plurality", as used herein, is defined as two, or more than two. The term "another", as used herein, is defined as at least a second or more. Unless otherwise indicated herein, the use of relational terms, if any, such as "first" and "second", "top", "bottom", and the like are used solely to distinguish one entity or action from another entity or action without necessarily requiring or implying any actual such relationship, priority, importance or order between such entities or actions.

The use of "or" or "and/or" herein is defined to be inclusive (A, B or C means any one or any two or all three letters) and not exclusive (unless explicitly indicated to be exclusive); thus, the use of "and/or" in some instances is not to be interpreted to imply that the use of "or" somewhere else means that use of "or" is exclusive.

The terms "includes", "including" and/or "having", as used herein, are defined as comprising (i.e., open language).

It should also be noted that one or more exemplary embodiments may be described as a method. Although a method may be described in an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein the word "layer" may refer to a single layer or to a plurality of layers depending on the context.

As used herein, the term "embodiment" or "exemplary" mean an example that falls within the scope of the invention(s).

Figure 1B:
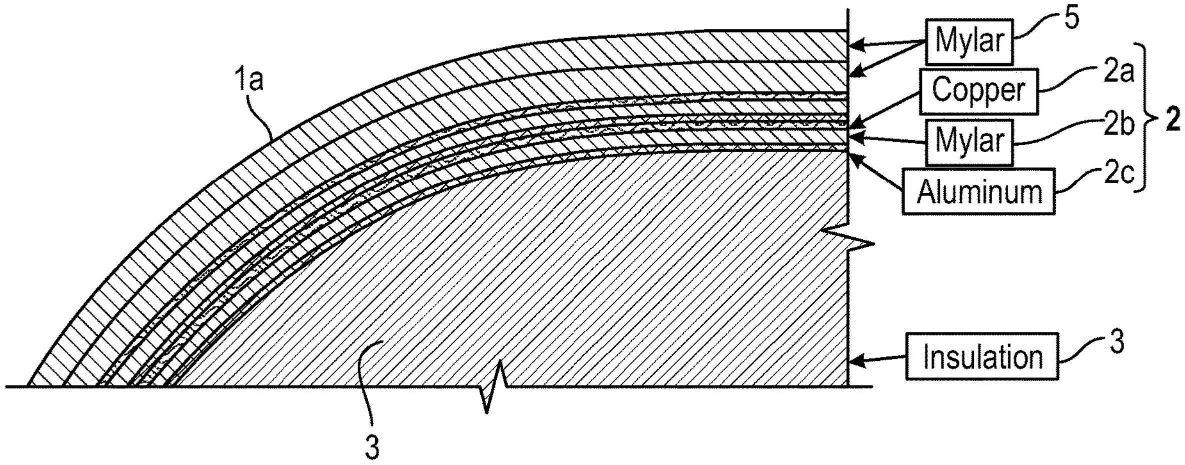

Referring now to FIGS. 1A and 1B there is depicted an embodiment of an inventive data/telecommunication cable 1*a*, where FIG. 1B shows an enlarged view of a section of data/telecommunication cable 1*a* in FIG. 1A.

Cable 1*a* may comprise at least an electromagnetic shield 2 (see FIG. 1B), insulation 3 surrounding one or more core conductors 4*a*, 4*n* (where "n" indicates a last conductor) and an outer insulating layer 5. In the embodiment depicted in FIG. 1A the inventive cable 1*a* comprises two core conductors though it should be understood that this is merely exemplary. Alternatively, the cable 1 may comprise a single core conductor or may comprise more than two core conductors.

In an embodiment, the shield 2 may be incorporated into a twinax cable forming an inventive, grounded and shielded twinax cable, for example.

As shown, the shield 2 may comprise a plurality of layers 2*a* to 2*c*, for example. Starting from the outermost layer 2*a* to the inner most layer 2*c*, the various layers 2*a* to 2*c* may comprise: (i) one or more first or outer conductive shield layers 2*a*. (ii) one or more inner insulating layers 2*b* and (iii) one or more second or inner conductive shield layers 2*c*. Hereafter, for the sake of simplicity each of the "one or more" layers" may be referred to as a "layer". As constructed in this embodiment, shield layers 2*a* and 2*c* may be configured as foil shield layers and/or configured to form an electrical ground return path, for example.

In one embodiment, the inner and outer insulating layers 2*b*, 5 may be composed of a Mylar or polyethylene terephthalate (PET) material, the first or outer conductive shield layer 2*a* may be composed of a copper material while the second or inner conductive shield layer 2*c* may be composed of an aluminum material, for example. Further, in one embodiment the outer insulating layer 5 may be configured as two layers of a Mylar or PET material, for example. Though Mylar and PET may be used as the composition for the insulating layers 2*b*, 5 it should be understood that this is merely exemplary. Alternative embodiments may, as a substitute for Mylar or PET, use another insulating material whose properties allow the substitute material to be inserted between the first and second shield layers 2*a*, 2*c* (i.e., the properties of the material used for layer 2*b*, 5 should enable the materials in layers 2*a*, 2*c* to be used, and the properties of the material used for layers 2*a*, 2*c* should enable the materials in layer 2*b*, 5 to be used).

In an alternative embodiment, the outer insulating layer 5 may be configured as a single layer of a Mylar or PET material, for example.

Recognizing that copper may be far more susceptible to cracking during handling/bending as compared with aluminum, and thus the outer copper layer 2*a* that is functioning as an electromagnetic shield may fail in certain locations, the inventors discovered that by wrapping the aluminum layer 2*c* around the insulation 3 and conductors 4*a*, 4*n* over an angle of 360 degrees or more, for example, the aluminum layer 2*c* may function as a 360 degree electromagnetic shield should such cracks or openings occur in the copper layer 2*a*. Accordingly, the inventive cable 1*a* comprises a multi-layered, grounded electromagnetic shield 2. It should be noted that in an alternative embodiment, the aluminum layer 2*c* may be wrapped around the insulation 3 and conductors 4*a*, 4*n* over an angle that is less than 360 degrees.

Exemplary dimensions (i.e., thicknesses) for the copper shield layer 2*a* and aluminum shield layer 2*c* may be 9 μm, for example though, again, this is merely exemplary. In alternative embodiments the thicknesses of each layer 2*a*, 2*c* may not be the same. An exemplary dimension (i.e., thickness) for the inner insulating layer 2*b* may be 12 μm in thickness, for example though, again, this is merely exemplary. In an embodiment, when the inner insulating layer 2*b* comprises more than one layer, each layer may be 12 μm in thickness, for example.

In one embodiment the shield 2 and its layers 2*a* to 2*c* may have the flexibility of a vinyl electrical tape, for example.

The inventors discovered that the inventive cable 1*a* configured as described herein may result in the formation of a displacement, electrical current between inner and outer conductive shield layers 2*a*, 2*c*, respectively. Such a current may create a functional local, coupling capacitance between layers 2*a*, 2*c*. Further, the inventors discovered that the existence of such a local, coupling capacitance may electromagnetically shield the core conductors 4*a*, 4*n* by, for example, absorbing high frequency components of unwanted, alternating current (AC) signals (e.g., interfering signals).

Although aluminum and copper (e.g., two dissimilar metals) are used in this embodiment for the composition of the outer conductive layer and inner conductive layer, respectively, it should be understood that other material compositions may be substituted and used provided that such substitute material compositions function to provide the respective shielding functions of the copper and aluminum materials, respectively, and, in addition, have material properties that are similar to copper and/or aluminum, respectively. For example, in the case of aluminum, another substitute material should provide the shielding that the aluminum shield layer 2*c* would provide should the copper shield layer 2*a* fail. Further, the material that is substituted for the copper material should be substantially as solderable as copper should the need arise to connect the cable 1*a* to another cable, or to a PCB, electronic device or apparatus, for example.

One or more layers 2*a* to 2*c* and 5 of the exemplary, inventive shield 2 may be bonded together using a laminated adhesive, for example. For example, layers 2*a* to 2*c* may be bonded together to form the shield 2 by, for example, configuring the insulating layer 2*b* with a laminated adhesive layer on each side surface such that one side surface of the layer 2*b* bonds with the outer shield layer 2*a* and the other side surface bonds with the inner shield layer 2*c*, for example. In an embodiment, the laminated adhesive layer may be composed of a polyurethane material, for example, and may have a nominal thickness of 3 μm for example.

Accordingly the shield 2 may be configured and applied as an integral, bonded component. In addition, as part of a process of constructing the shield 2 a laminated adhesive layer (not shown in figures) may be applied to one side surface of the inner shield layer 2*c* (e.g., the aluminum shield layer) that faces the insulation 3 in order to make sure the layer 2*c* satisfactorily adheres to the insulation 3 and, in addition, adheres at an overlapping position "B" shown in FIGS. 1B and 2 as described elsewhere herein. Thus, an inventive inner shield layer 2*c* may comprise at least two layers; a conductive shield layer and an adhesive layer, for example. In an embodiment, such an adhesive layer may be composed of a polyurethane material, for example, and may have a nominal thickness of 3 μm, for example.

The integral, bonded inventive shield 2 may be applied to the insulation 3 that surrounds the core conductors 4*a*, 4*n*. For example, an inventive, grounded and shielded cable 1 may be configured such that the shield 2 is configured longitudinally around the insulation 3. Accordingly, by applying the inventive shield 2 longitudinally, a coiled electrical inductance that may be developed along the length of the shield 2 may be reduced. Further, such a reduction in inductance may prevent the degradation of the grounding path formed by the outer and inner shield layers 2*a*, 2*c*, particularly at high frequencies (e.g., 1 MHz and above extending to the upper operating limits of a respective cable, the cable or as high as approximately 70 GHz). In such an embodiment where the shield 2 is applied longitudinally, the outer insulating layer 5 may comprise two Mylar or PET layers, for example. Further, such Mylar or PET layers may be helically applied over the shield 2 in such that each Mylar or PET layer opposes or crosses the other Mylar or PET layer, for example.

It should be understood, however, that an inventive cable may be configured to comprise other shield configurations. For example, as explained elsewhere herein an inventive, grounded and shielded cable may be configured such that an electromagnetic shield is configured helically around insulation, for example. In such an embodiment, the outer insulating layer (e.g., layer 5) may comprise a single, helically applied Mylar or PET layer, for example.

In one embodiment, the shield 2 may be applied beginning at position "A" ("starting position") so that inner shield layer 2*c* (e.g., aluminum shield layer) is applied on top of the insulation 3 and closer to the insulation 3 than the outer shield layer 2*a* (e.g., the copper shield layer). So applied, when needed the inventive cable 1*a* can be ablated or stripped by, for example, removing the outer Mylar or PET layer(s) 5 thereby exposing the outer shield layer 2*a*—in this case a copper shield layer—to allow the outer shield layer 2*a* to be soldered to another similar layer of another cable, or to a connector, PCB or electronic device, for example, as explained more elsewhere herein.

Figure 2:
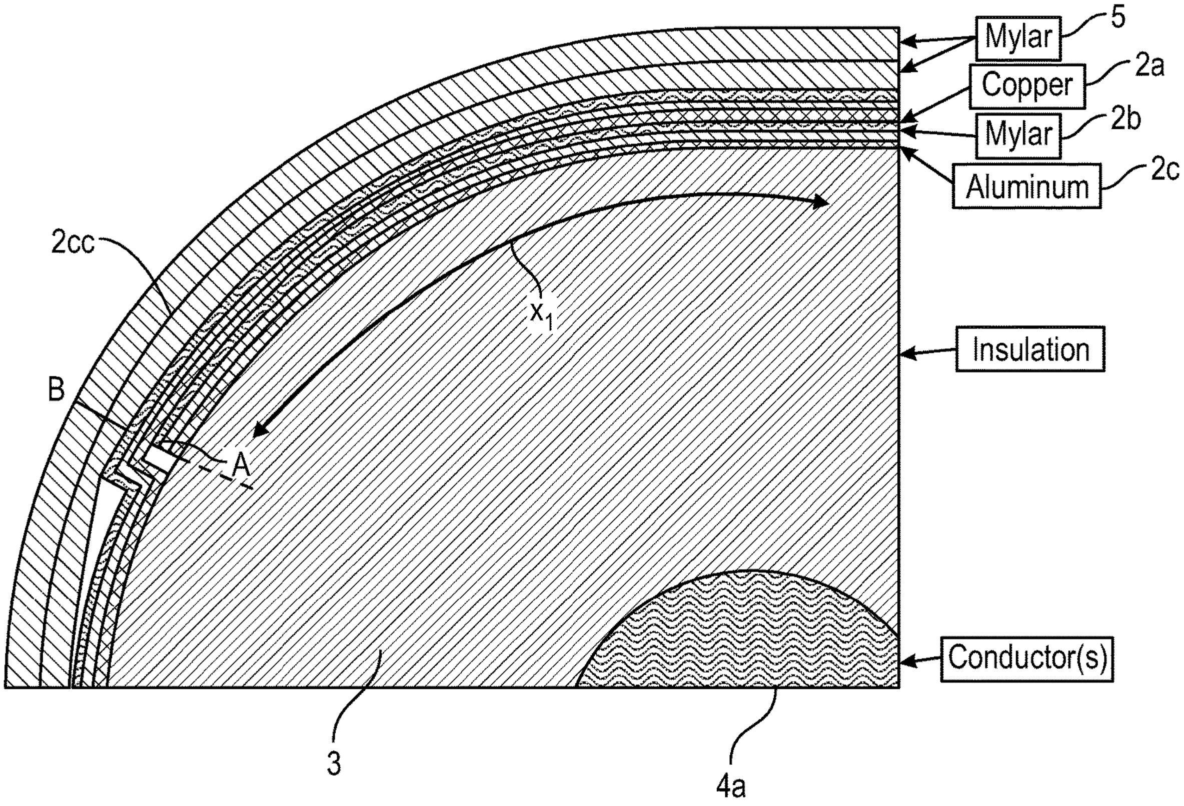
FIG. 2 depicts a section of an exemplary, inventive cable according to an embodiment of the invention.

After the shield 2 has been wrapped around the insulation 3 and core conductors 4*a*, 4*n* at 360 degrees or more, for example, it begins to make physical contact at a position above position A—referred to as position B—or the beginning of an "overlapped portion" (see FIG. 2). More particularly, the adhesive layer of the inner shield layer 2*cc* (e.g., composed of polyurethane) which has been wrapped at least 360 degrees may be overlapped by an amount that exceeds 360 degrees as indicated by the label "$x_1$" in FIG. 2 beginning at the overlapped position B.

Said another way, the shield 2 may be configured around the insulation 3 and one or more core conductors 4*a*, 4*n* at an angle of more than 360 degrees, wherein the overlapped portion of the shield 3 that is configured more than 360 degrees (i.e., the overlapped portion) is configured to provide a direct electrical connection between the inner conductive layer and outer conductive layer.

Such an applied, overlapping shield may form a "cigarette-like" wrapping. In an embodiment, as configured the overlapped shield provides a direct electrical connection between the underlying aluminum as it overwraps the upper copper shield, thereby providing an opportunity for a direct (galvanic) connection between the aluminum and copper shields, effectively forming a second means of electrical communication in addition to the previously mentioned capacitive communication by displacement current at elevated frequencies.

In embodiments of the invention, the overlapped portion or amount $x_1$ may have a length substantially equal to 20% to 70% of the overall circumference of the shield 2 measured at 360 degrees. In one embodiment the overlapped portion or amount $x_1$ may be 50% of the overall circumference of the shield 2 measured at 360 degrees, for examples.

Thus, the inner shield layer 2*c* provides a continuous electromagnetic shield to protect signals and data being transported within the core conductors 4*a*, 4*n*. Yet further, as previously mentioned, beginning at the overlapped position B the inner shield layer 2*c* may make direct galvanic contact (i.e., physical and electrical contact) with the outer shield layer 2*a* over the overlapped portion. Accordingly, this contact provides a ground return path for the shield 2 that allows a direct current to flow, where the path traverses the outer shield layer 2*a* and the inner shield layer 2*c*, eliminating the need to use a traditional electrical drain wire. Though the two shield layers 2*a*, 2*c* make physical and electrical contact with another, in one embodiment these layers need not be bonded together at such contact points.

Relatedly, the insulating layer 5 may also be configured such that it is wrapped at least 360 degrees (as measured from a center of the cable 1*a*). In an embodiment the insulating layer 5 may be wrapped more than 360 degrees around such a center. For example, as noted elsewhere herein, the shield 2 may be longitudinally wrapped around such a center forming an overlapped portion, for example, while the insulating layer(s) 5 may be helically cross-wrapped around the center to form an overlap as well.

Figure 3:
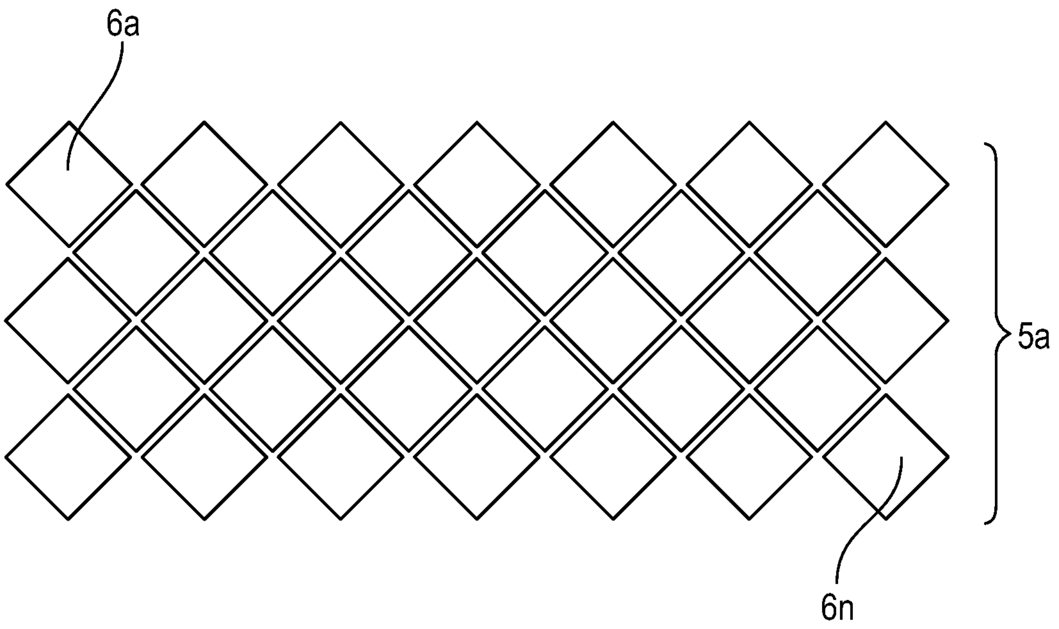
FIG. 3 depicts an exemplary configuration of an adhesive layer according to an embodiment of the invention.

Additionally, in one embodiment the outer insulating layer 5 may further comprise a heat-sealed adhesive layer 5*a* configured as a plurality of diamond-shaped sections 6*a* to 6*n* (where "n" indicates the last section), for example. The heat-sealed adhesive layer 5*a* may be applied to a surface of a side of the layer 5 that makes contact with the outer shield layer 2*a*. In more detail, referring to FIG. 3, the plurality of diamond-shaped sections 6*a* to 6*n* may have an area that may measure 0.7 mm square with a gap of 0.4 mm between each square, for example. The inventors discovered that by so configuring the area of each diamond-shaped section 6*a* to 6*n*, resonance that may occur between the outer insulating layer 5 and shield 2 may be controlled (e.g., minimized). In an embodiment, such an adhesive layer may be helically wrapped around the outer shield layer 2*a*, for example.

In an embodiment, the adhesive layer 5*a* may be composed of an ethylene acrylic acid copolymer, for example, and may have a nominal thickness of 3 μm, for example.

Figure 4A:
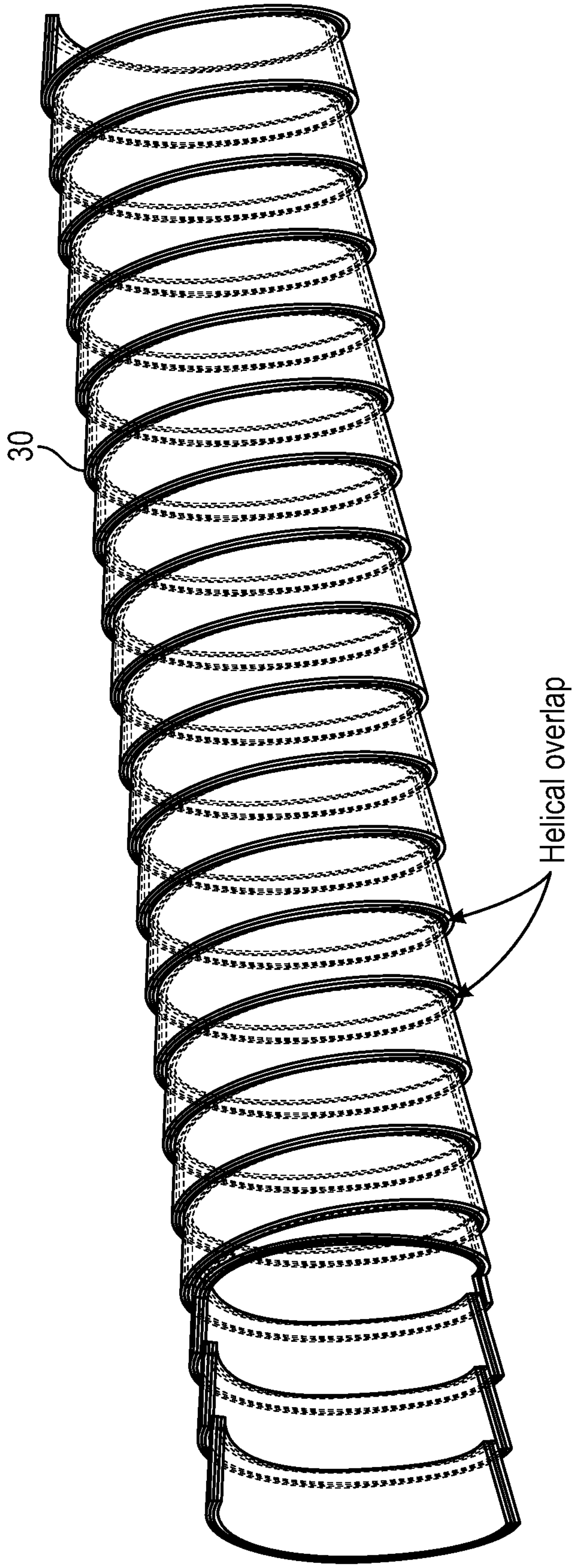
FIGS. 4A and 4B depict different views of an alternative inventive cable according to an embodiment of the invention.
Figure 4B:
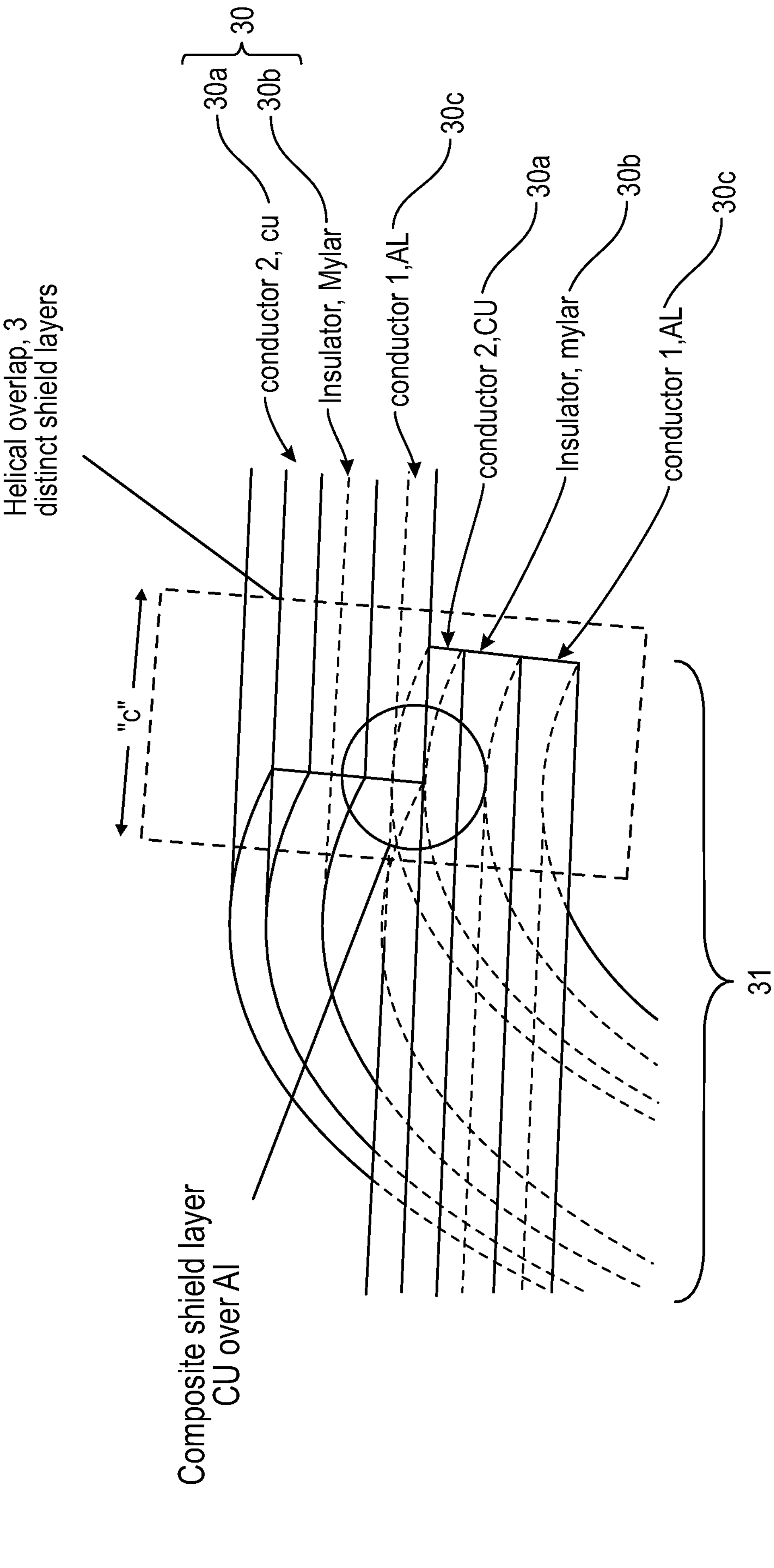

Referring now to FIGS. 4A and 4B there is depicted different views of an alternative configuration of an inventive, grounded and shielded data/telecommunication cable 31 that may be configured such that a shield 30 is configured helically around the insulation (not shown, but see component 3 in FIGS. 1A and 1B) that surrounds one or more core conductors so that it forms a helical shape around the center of the inventive cable 31. In embodiments, such an inventive cable 31 that comprises the shield 30 may further comprise two core conductors (not shown, but see components 4*a*, 4*n* in FIG. 1A) though it should be understood that this is merely exemplary. Alternatively, an inventive cable 31 comprising the shield 30 may comprise a single core conductor or may comprise more than two core conductors.

In an embodiment, the inventive shield 30 may be incorporated into a twinax cable forming an inventive, shielded twinax cable, for example.

The shield 30 may comprise a plurality of layers 30*a* to 30*c*, for example. Starting from the outermost layer 30*a* to the inner most layer 30*c*, the various layers 30*a* to 30*c* may comprise: (i) one or more first or outer conductive shield layers 30*a*, (ii) one or more inner insulating layers 30*b* and (iii) one or more second or inner conductive shield layers 30*c*. Hereafter, again, for the sake of simplicity each of the "one or more" layers" may be referred to as a "layer".

As constructed in this embodiment, shield layers 30*a* to 30*c* may be configured as a foil shield layer and/or configured to form an electrical ground return path, for example. In one embodiment, the insulating layer 30*b* may be composed of a Mylar or PET material, the first conductive shield layer 30*a* may be composed of a copper while the second conductive shield layer 30*c* may be composed of an aluminum, for example. Though an outer insulating layer is not shown it should be understood that such a layer may be helically applied over the shield 30, and may be configured as a single layer of a Mylar or PET material, for example. Though Mylar or PET may be used as the composition for the insulating layer it should be understood that this is merely exemplary.

Similar to before, recognizing that copper may be far more susceptible to cracking during handling/bending as compared with aluminum, and thus the outer copper layer 30*a* that is functioning as an electromagnetic shield may fail in certain locations, the inventors discovered that by wrapping the aluminum layer 30*c* around the core insulation and conductors (not shown in FIGS. 4A and 4B) underneath the copper layer 30*a* may function as an electromagnetic shield should such cracks or openings occur in the copper layer 30*a*. Accordingly, the inventive shield 31 comprises a multi-layered, electromagnetic shield 31.

Exemplary dimensions for the copper shield layer 30*a* and aluminum shield layer 30*c* may 9 μm, for example though, again, this is merely exemplary. In alternative embodiments the thicknesses of each layer 30*a*, 30*c* may not be the same. In one embodiment the shield 30 and its layers 30*a* to 30*c* may have the flexibility of a vinyl electrical tape, for example.

Although aluminum and copper (e.g., two dissimilar metals) are used in this embodiment for the composition of the outer conductive layer and inner conductive layer, respectively, it should be understood that other material compositions may be substituted and used provided that such substitute material compositions function to provide the respective shielding functions of the copper and aluminum materials, respectively, and, in addition, have material properties that are similar to copper and/or aluminum, respectively. For example, in the case of aluminum, another material should provide the shielding that the aluminum shield layer 30*c* would provide should the copper shield layer 30*a* fail.

One or more layers 30*a* to 30*c* of the exemplary, inventive shield 31 may be bonded together using a laminated adhesive. For example, layers 30*a* to 30*c* may be bonded together to form the shield 20 by, for example, configuring the insulating layer 30*b* with a laminated adhesive layer on each side surface such that one side surface of the layer 30*b* bonds with the outer shield layer 30*a* and the other side surface bonds with the inner shield layer 30*c*, for example. In an embodiment, such an adhesive layer may be composed of a polyurethane material, for example, and may have a nominal thickness of 3 μm, for example.

Accordingly the shield 30 may be configured and applied as an integral, bonded component. In addition, as part of a process of constructing the shield 30 a laminated adhesive layer (not shown in figures) may be applied to one side surface of the inner shield layer 30*c* (e.g., the aluminum shield layer) that faces the core insulation (not shown, but see component 3 in FIGS. 1A and 1B) in order to make sure the layer 30*c* satisfactorily adheres to the core insulation and, in addition, adheres to the overlapped layer at an overlapping position "C" shown in FIG. 4B. Thus, an inner shield layer 30*c* may comprise at least two layers; a conductive shield layer and an adhesive layer, for example. In an embodiment the adhesive layer may be composed of a polyurethane material, for example, and may have a nominal thickness of 3 μm, for example.

Thereafter, the integral, bonded shield 30 may be applied helically to the core insulation that surrounds the core conductors. In one embodiment, the shield 30 may be applied so that inner shield layer 30*c* (e.g., aluminum shield layer) is applied on top of the insulation 3 and closer to the insulation 3 than the outer shield layer 30*a* (e.g., the copper shield layer). So applied, when needed an inventive cable 31 that includes the shield 30 can be ablated or stripped by, for example, removing the outer Mylar or PET insulating layer thereby exposing the outer shield layer 30*a*—in this case a copper shield layer—to allow the outer shield layer 30*a* to be soldered to another similar layer of another cable, or to a connector, PCB, or electronic device, for example, as explained more elsewhere herein.

After the shield 30 has been helically wrapped around the core insulation and core conductors more than 360 degrees, for example, it begins to make physical contact along a length C—referred to as the helical overlapped portion (see FIG. 4B). More particularly, the adhesive layer of the inner shield layer 30*c* which has been helically wrapped may be overlapped more than 360 degrees by a portion or amount C. In embodiments of the invention, the helically overlapped portion or length C may have a length substantially equal to 20% to 70% of the overall circumference of the shield 30 measured at 360 degrees. In one embodiment the overlapped length may be 50% of the overall circumference of the shield 30 measured at 360 degrees, for example.

Said another way, the shield 30 may be configured around the core insulation and one or more core conductors at an angle of more than 360 degrees, wherein the overlapped portion of the shield 30 that is configured more than 360 degrees (i.e., the overlapped portion) is configured to provide a direct electrical connection between the inner conductive layer and outer conductive layer.

Thus, the inner shield layer 30*c* provides a continuous electromagnetic shield to protect signals and data being transported within the core conductors. Further, beginning at the helical overlapped position the inner shield layer 30*c* may make direct galvanic contact (i.e., physical and electrical contact) with the outer shield layer 30*a*. Accordingly, this contact provides a ground return path for the shield 30 that allows a direct current to flow, where the path traverses the outer shield layer 30*a* and the inner shield layer 30*c*, eliminating the need to use a traditional electrical drain wire. Though the two shield layers 30*a*, 30*c* make physical and electrical contact with another, in one embodiment these layers need not be bonded together at such contact points.

Relatedly, an outer insulating layer (again not shown in FIG. 4A or 4B but see component 5 in FIG. 1A) may also be configured such that it is helically wrapped around the center of the inventive cable 31. For example, the insulating layer may be helically cross-wrapped around the center similar to how the shield 30 is wrapped around as illustrated in FIGS. 4A and 4B to form an overlap as well.

Additionally, in one embodiment a heat-sealed adhesive layer may be applied to a surface of a side of the outer insulating layer that makes contact with the outer shield layer 30*a*. For example, the heat-sealed adhesive layer may be formed as the layer 5*a* that comprises a plurality of diamond-shaped sections 6*a* to 6*n* described elsewhere herein.

In sum, as set forth above and shown in the figures, an inventive method for providing an inventive, grounded and shielded data/telecommunication cable may comprise: (i) applying insulation around one or more core conductors; (ii) applying an electromagnetic shield around the insulation, wherein the shield comprises at least one or more outer conductive shield layers, one or more inner insulating layers and one or more inner conductive shield layers, wherein the one or more outer and inner conductive shield layers are configured to form an electrical ground return path; and (iii) applying an outer insulating layer around the electromagnetic shield. Further, as described previously, such a method may further comprise forming the electromagnetic shield as an integral, bonded component, applying the electromagnetic shield longitudinally or helically around the insulation and/or applying the electromagnetic shield around the insulation at an angle of more than 360 degrees, wherein a portion of the shield that is applied more than 360 degrees (i.e., the overlapped portion) provides a direct electrical connection between the inner conductive layer and outer conductive layer, where the direct electrical connection further forms direct galvanic contact over the overlapped portion of the shield.

As mentioned briefly elsewhere herein, inventive cables that incorporate shields may need to be connected to another cable, or to a connector, PCB (e.g., paddle card) or electronic device, for example. Realizing this, the inventors discovered inventive structures and related methods to complete such a connection(s).

Figure 5A:
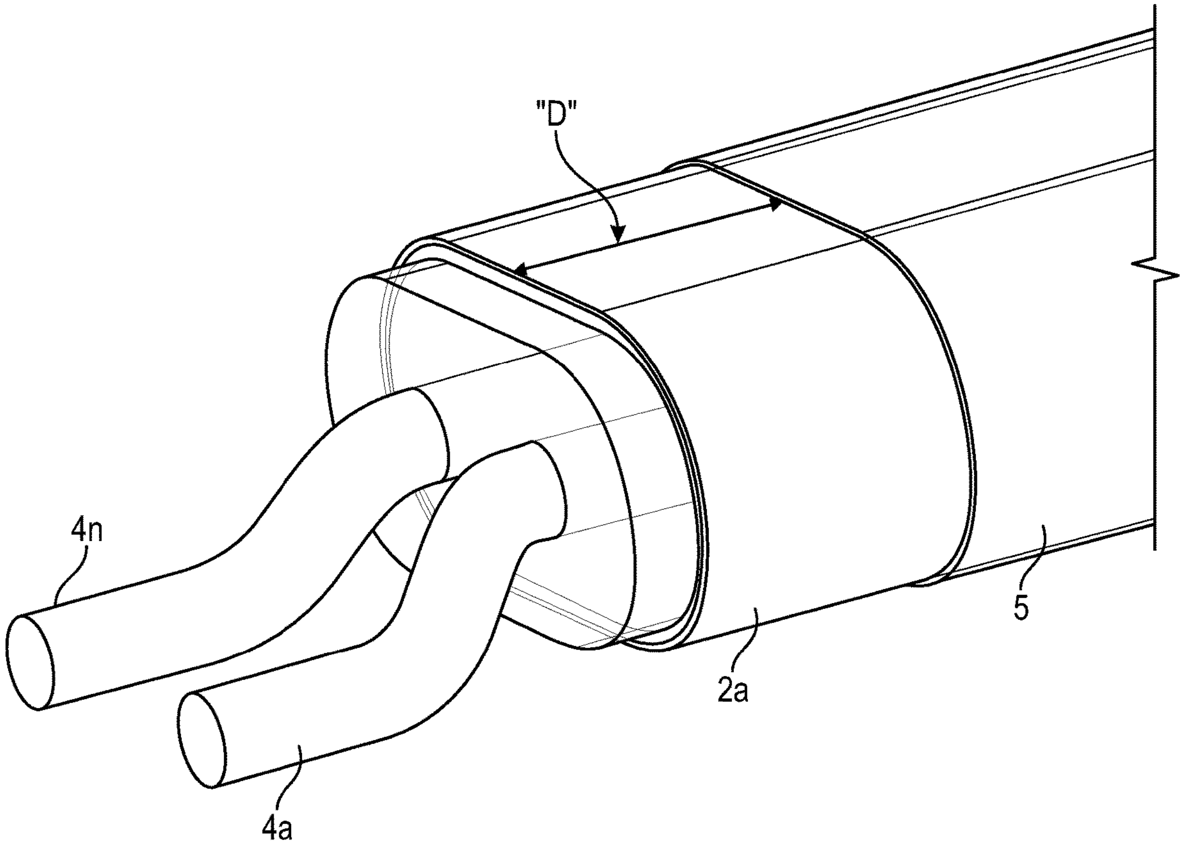
FIGS. 5A and 5B depict different methods of connecting an inventive cable according to embodiments of the invention.

In embodiments of the invention, inventive cables, such as cables 1*a*, 31 can be ablated or stripped by, for example, by removing the outer insulating Mylar or PET layer(s) of the cable 1*a*, 31 thereby exposing an outer shield layer—in this case a copper shield layer—to allow the outer shield layer to be connected to another cable, PCB, connector or electronic device, for example For example, referring now to FIG. 5A there is illustrated a different view of inventive cable 1*a*. As depicted, a length D of the outer insulating layer(s) 5 has been removed from the entire circumference (i.e., 360 degrees) of an end section of the cable 1*a* thereby exposing the outer shield layer 2*a* (e.g., the copper layer) of the cable 1*a*. Once the insulating layer (or layers) 5 has been removed the cable 1*a* may be connected to another cable, or to a PCB, electronic device or connector, for example. In one embodiment, solder may be applied to the exposed copper layer 2*a* to connect the cable 1*a*.

Figure 5B:
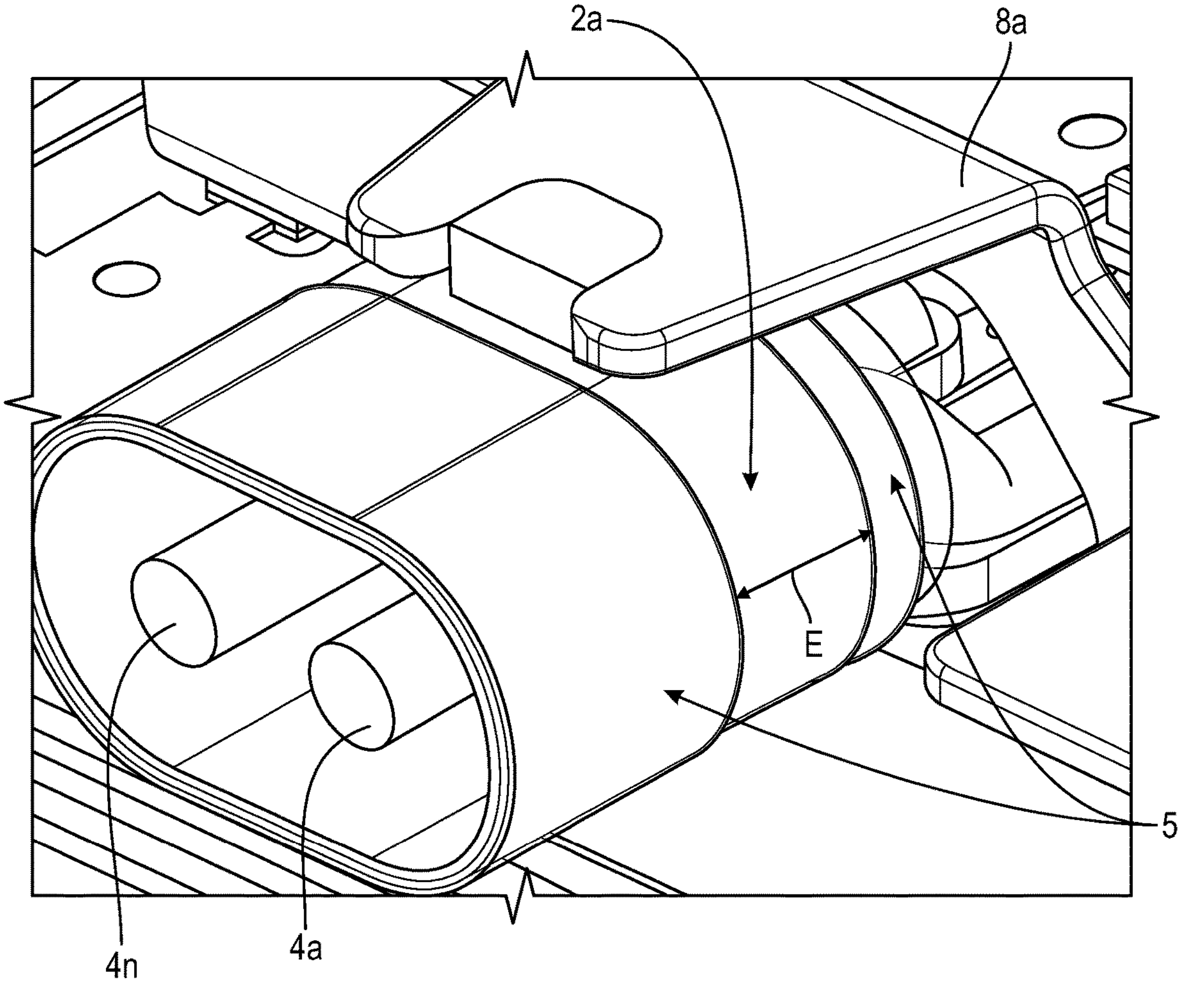

Referring now to FIG. 5B there is illustrated another, different view of inventive cable 1*a*. As depicted, a length E of the outer insulating layer(s) 5 has been removed from the entire circumference (i.e., 360 degrees) of a middle section of the cable 1*a* thereby exposing the outer shield layer 2*a* (e.g., the copper layer). As compared with the end section in FIG. 5A, the middle section of the insulating layer 5 forms a "slice" of the layer 5 and does not include the end of the layer 5.

Also shown in FIG. 5B is solder element 7*a* that has been applied to the exposed outer shield layer 2*a* (e.g., copper layer) thereby connecting the inventive cable 1*a* to a first or top conductive element 8*a*, for example.

Figure 6A:
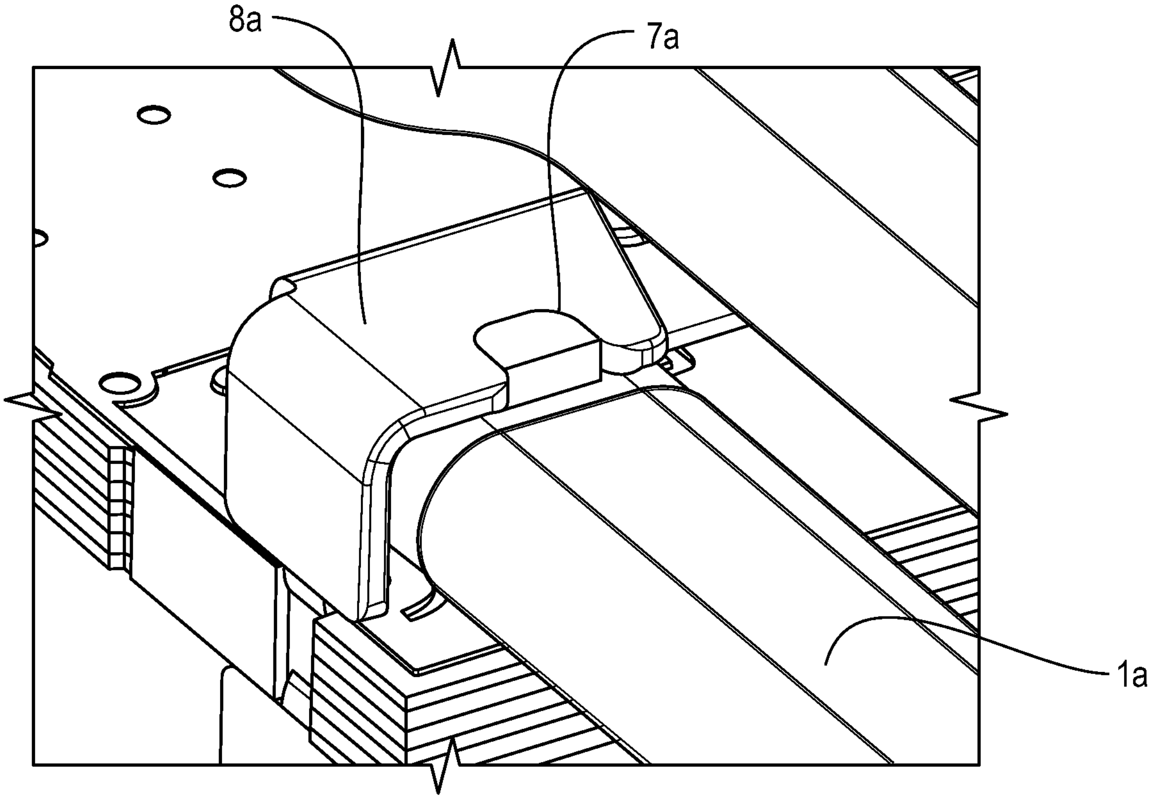
FIGS. 6A and 6B depict different views of a connection method according to an embodiment of the invention.
Figure 6B:
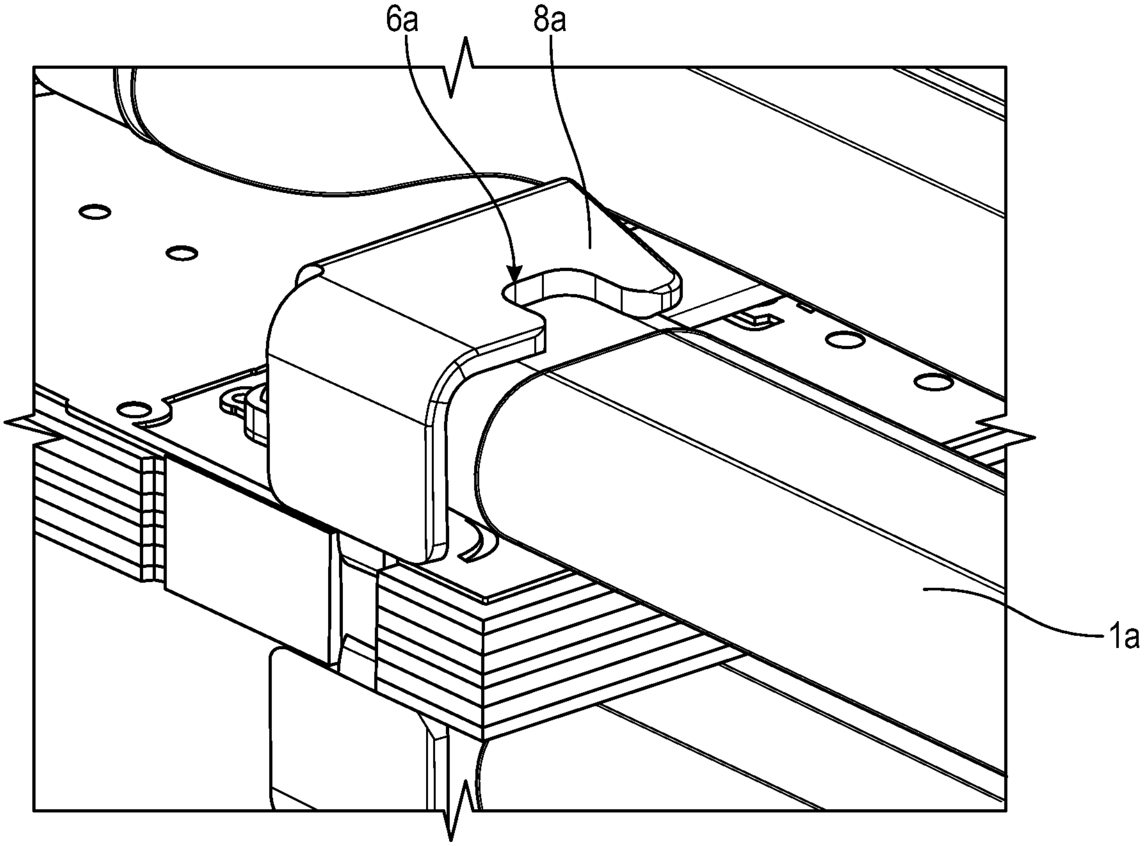

Referring now to FIG. 6A there is depicted another view of the inventive cable 1*a* connected to the ground, conductive element 8*a* using solder element 7*a*, for example. In an embodiment, the element 8*a* may comprise a top, open connecting section 6*a* (e.g., a notch; see FIG. 6B) that has been removed in order to receive and hold the solder element 7*a* in order to allow the solder element 7*a* to thereafter form a connection to both the outer layer 2*a* of the cable 1*a* and the element 8*a*. It should be understood that the exposed outer layer 2*a* may be exposed using by removing the slice of the outer insulating layer 5 as in FIG. 5B or by removing the circumferential end section as in FIG. 5A, for example.

Though one example of a connection using solder has been described herein, it should be understood that different connection or termination methods and structures may be alternatively used, such as those that involve soldering to a grounding structure different than that shown or that involves accessing the shield through outer insulating material differently than shown.

For example, each of the cables 1*a* to 1*n* may have a nub or protrusion that extends from an end of a respective cable into a respective top notch 6*a* to 6*n*. Yet further some combination of protrusions and solder may be used as well.

Still further, the inventive cables described herein may be connected to a PCB, electronic device or to another cable using an inventive connection structure.

Figure 7A:
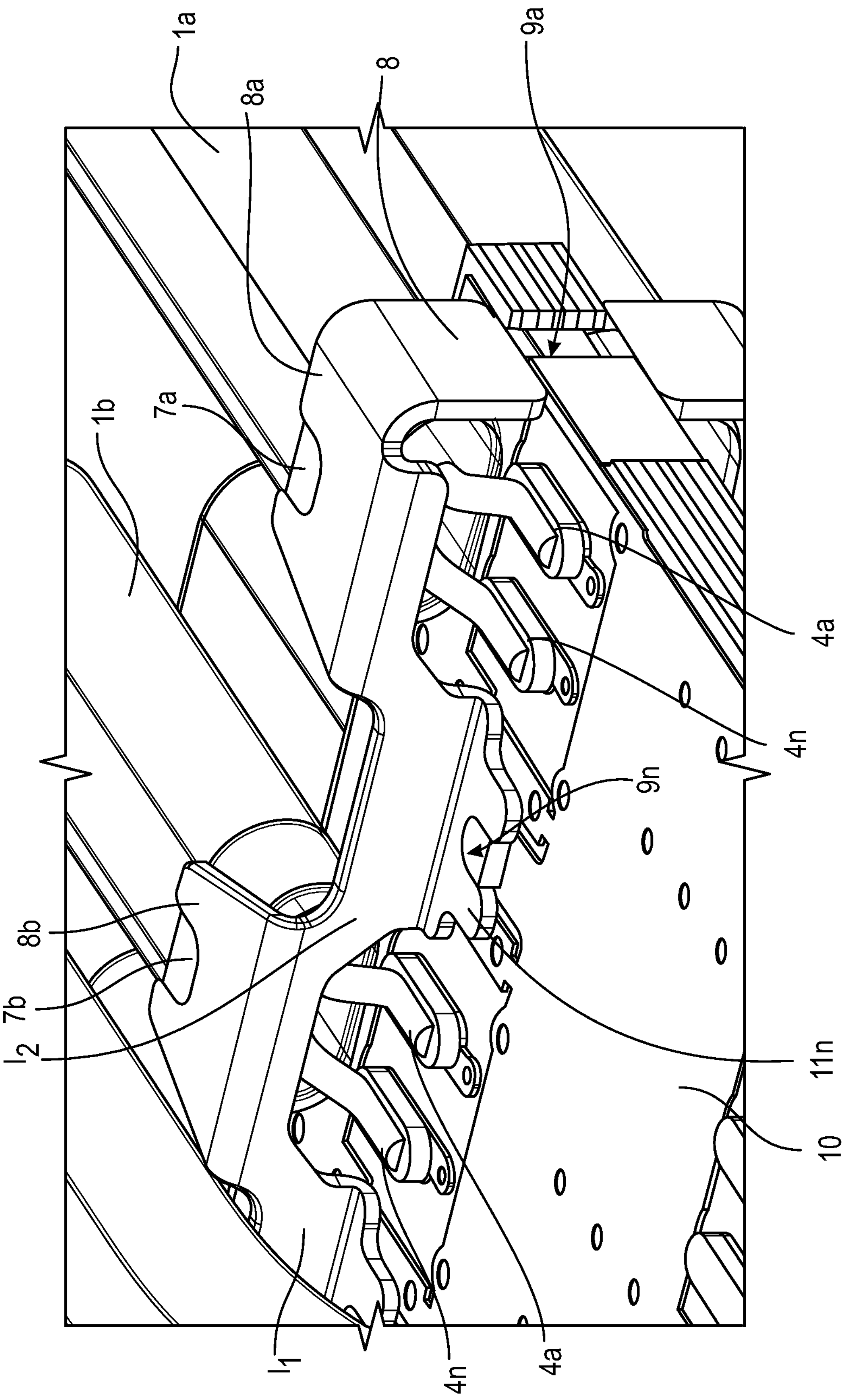
FIGS. 7A to 7D depict views of inventive conductive straps according to embodiments of the invention.

Referring now to FIG. 7A there is depicted a view of inventive cables 1*a* and 1*b* connected to a PCB 10, for example. In accordance with an embodiment of the invention, each cable 1*a*, 1*b* may be configured to include the elements of cable 1*a* or 30 described elsewhere herein including, but not limited to, an outer insulating layer, inventive shield, adhesive layers, heat-seal layers (including the diamond-shaped layer), insulation and one or more conductors 4*a* to 4*n*, for example.

As shown, each of the cables 1*a*, 1*b* may be connected to the PCB 10 by an inventive connection structure that includes, for example, a corresponding first or top ground, conductive element 8*a*, 8*b* respectively, and respective solder elements 7*a*, 7*b*, for example. In an embodiment, each of the first or top ground, conductive elements 8*a*, 8*b* may comprise a respective top, open ground connecting section (e.g., a notch; see section 6*a* in FIG. 6B) that has been removed in order to receive and hold the respective solder element 7*a*, 7*b* to allow the connection structure to thereafter form a connection to a respective outer shield layer of corresponding cable 1*a*, 1*b*, and element 8*a*, 8*b* by, for example, receiving and holding solder element 7*a* within a section (e.g., section 6*a*), wherein the solder element 7*a* may connect the conductive element 8*a* to the exposed, outer shield layer. It should be understood that the exposed outer layer may be exposed by removing the slice of an outer insulating layer (see element 5 in FIG. 5B) or by removing the circumferential end section (see FIG. 5A), for example.

In an embodiment the first or top conductive elements 8*a*, 8*b* may be a part of an inventive, ground conductive strap 8, for example. In an embodiment, the strap 8 may be composed of a formable conductive metal or alloy, such as a copper-based metal or alloy (e.g., C110, 1/2 tempered), for example, and may have a thickness of 0.20 mm, +/−1 mm, for example, so that is capable of forming a solder bond. The surface of the strap 8 may further be plated with a tin matte layer having a thickness of 0.76 μm over a nickel layer that may have a thickness of 1.0 μm, for example.

Figure 8A:
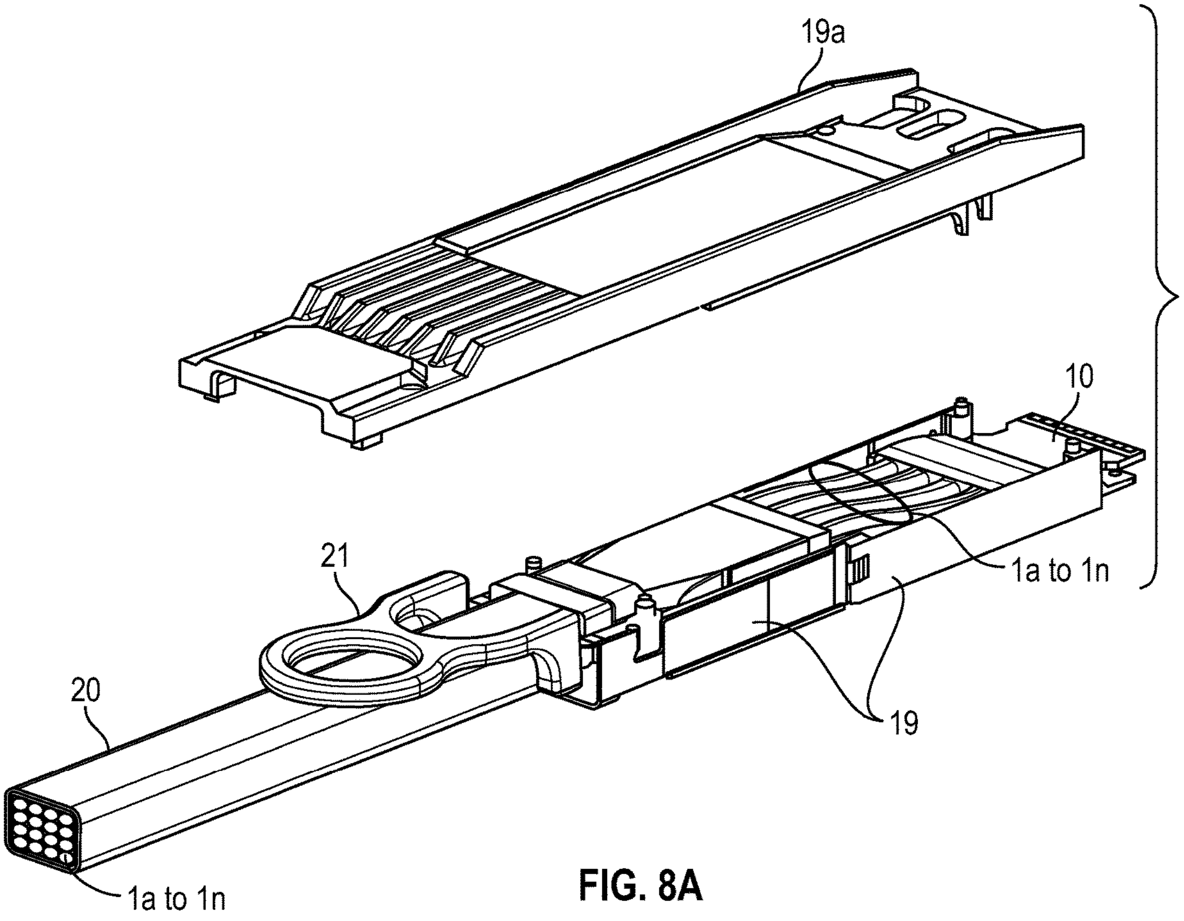

As shown in FIG. 7A, in addition to connecting the inventive conductive strap 8 to cables 1*a* to 1*n*, the strap 8—that is part of an inventive connection structure—the strap 8 may also be connected to the PCB 10 using integral and conductive, supporting structures or "legs" $l_1$ and $l_2$ and one or more middle and side solder elements 9*a* to 9*n* (where "n" is the last middle or side solder element), where the middle solder elements may be inserted into respective second or bottom conductive elements (see elements 11*a* to 11*n* in FIG. 8A). In an embodiment, each of the second or bottom conductive elements may comprise a respective bottom, open connecting section (e.g., a notch; see sections 12*a* to 12*n* in FIG. 8A) that have been removed in order to receive and hold the respective solder element 9*n* to allow the connection structure to thereafter form a connection to a respective PCB 10 (i.e., the solder element 9*n* connects the strap 8 to the PCB 10).

The electrical and physical connections formed by the strap 8 with the cables 1*a* to 1*n* and PCB 10 may form a ground path, for example, that allows unwanted signals to flow to an electrical ground and thereby protect cables 1*a* to 1*n* and minimize the effect of such unwanted signals on desirable signals flowing within conductors 4*a* to 4*n* of each cable 1*a*, 1*b*. Further, the conductive strap 8 may reduce the effects of electrical crosstalk between respective cables 1*a* to 1*n* by, among other things, fixing the cables 1*a* to 1*n* in position.

Figure 7B:
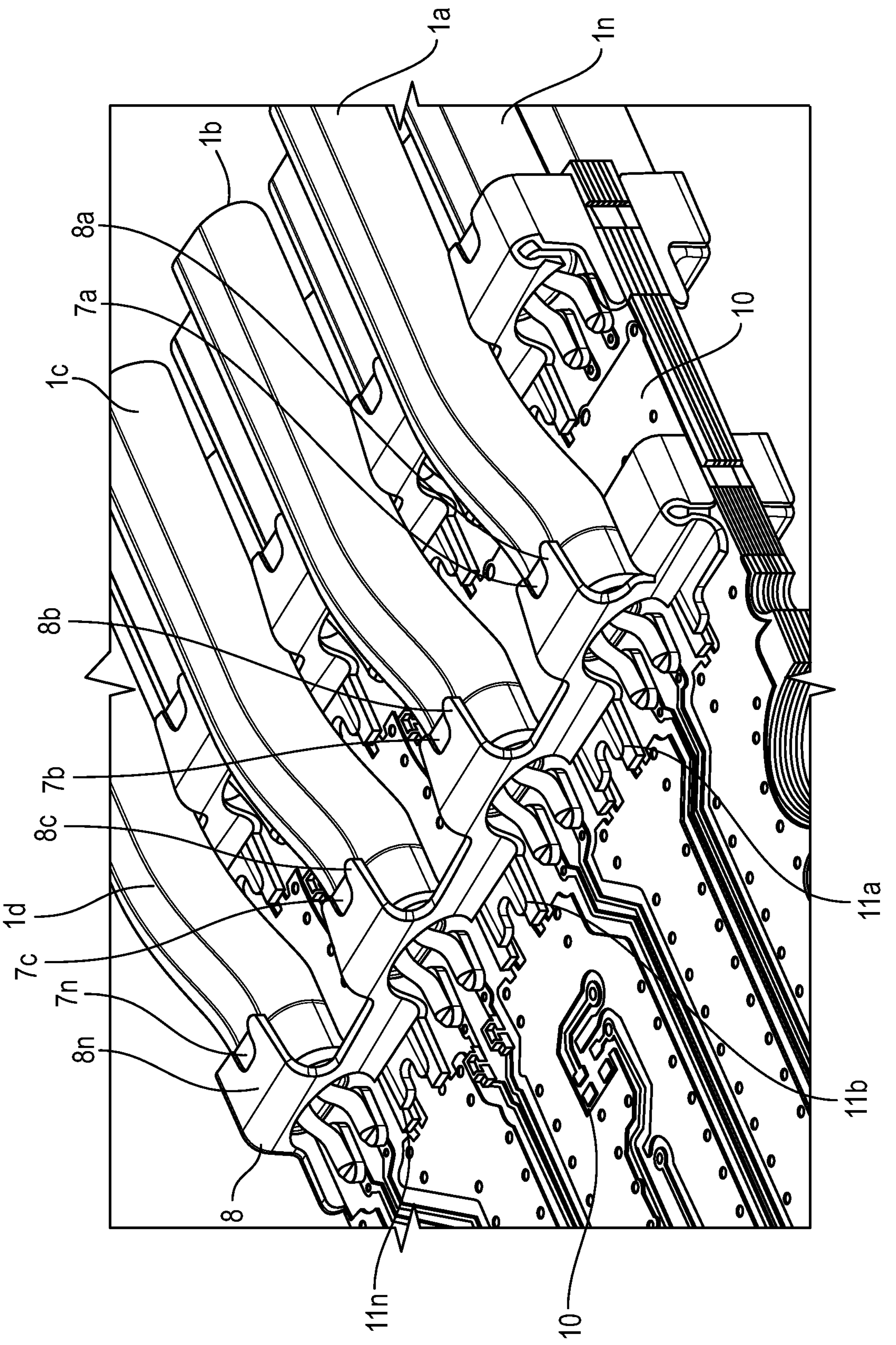
Figure 7C:
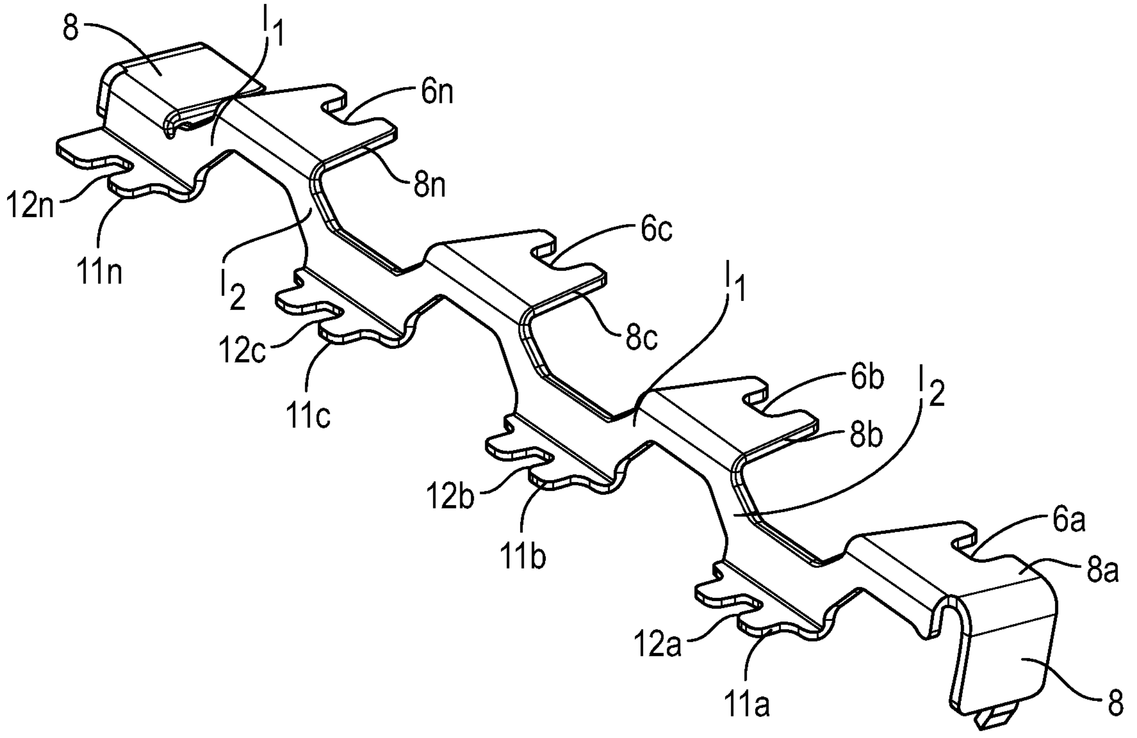

For the reader's reference FIGS. 7B and 7C depict additional views of an exemplary, complete inventive, conductive strap 8 that may comprise a plurality of inventive, top conductive elements 8*a* to 8*n* and bottom conductive elements 11*a* to 11*n*. As shown in FIG. 7B, the strap 8 may function to connect a PCB 10 to one or more inventive cables 1*a* to 1*n*. That said, FIG. 7B depicts the strap 8 before solder elements (e.g., elements 9*a* to 9*n*) have been inserted into corresponding notches in the strap 8.

Similar to above, it should be understood that while solder elements are used to connect the strap, this is merely exemplary. Alternatively, for example, each of the cables 1*a* to 1*n* and/or PCB 10 may have a nub or protrusion (or a plurality of nubs or protrusions in the case of a PCB) that extends from an end of a respective cable or PCB into a respective, corresponding notch.

While the description above has focused on a single conductive strap 8, it should be understood that an inventive assembly may include a plurality of inventive, conductive straps, such as straps 8, 80 in FIG. 7B.

Figure 7D:
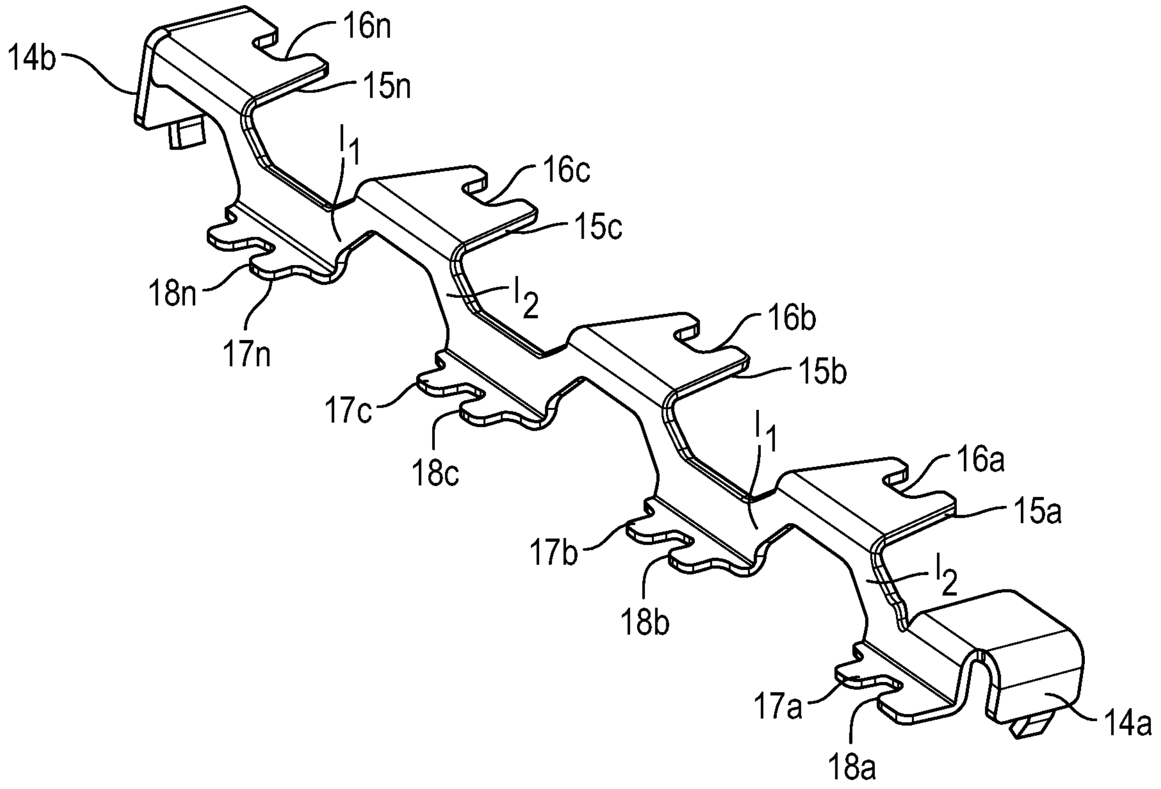

It should be understood that the configuration of the inventive straps 8, 80 shown in FIGS. 7A to 7C is merely exemplary and that other configurations are contemplated. For example, FIG. 7D depicts an alternative inventive strap 13 that may include different ends 14*a*, 14*b* than the strap 8. Inventive strap 13 may further include a plurality of inventive, top conductive elements 15*a* to 15*n* and bottom conductive elements 17*a* to 17*n*. As shown in FIG. 7D, each of the conductive elements may comprise a respective connecting element 16*a* to 16*n*, or 18*a* to 18*n*, respectively (e.g., a notches). The strap 13 may function to connect a PCB, cable, electrical device, connector, etc., to one or more inventive cables.

While FIGS. 7A to 7D depict the connection of the inventive cables 1*a* to 1*n* that include the shield described elsewhere herein, it should be understood that the inventive conductive strap 8 may be utilized to connect other cable configurations to a PCB (e.g., paddle card 10) that do not use the same type of cable or shield.

In more detail, as shown the connective structure (e.g., strap 8) is configured around a termination end of a cable 1*a* to 1*n* (i.e., where the cable terminates onto the structure) to separate the connected ground element of the cable 1*a* to 1*n* from the one or more conductors 4*a*, 4*n* of the cable 1*a* to 1*n* to prevent short circuits and to reduce unwanted crosstalk, for example, where that element may be an outer conductive layer as described elsewhere herein or another structure of the cable.

Continuing, as described previously the strap 8 may be connected to the PCB 10 using integral and conductive, supporting structures or "legs" 11 and 12, where each of the legs $l_1$ and $l_2$ may form a symmetrical ground path, each path including the structure that leads from a termination area (i.e., the position on the strap 8 where the ground conductor is connected to the strap 8) to a respective second or bottom conductive element 11*a* to 11*n*. Each of the bottom conductive elements 11*a* to 11*n* may be configured to make contact with the PCB 10 and may be connected to the PCB 10 by one or more middle and side solder elements 9*a* to 9*n* inserted into respective bottom, open connecting sections 12*a* to 12*n* in that have been removed from a respective bottom conductive element 11*a* to 11*n* in order to receive and hold the respective solder element 9*a* to 9*n* to allow the connection structure to thereafter form a connection to a respective PCB 10. Though the combination of solder elements and open connecting sections are depicted as connecting the strap 8 to the PCB 10, it should be understood that these are just one of many connective structures that may be used to connect the strap 8 to the PCB 10.

That is to say, while the inventors provide one embodiment of a connective structure (e.g., strap 8) that is connected to a PCB 10 using symmetrical ground paths on one side, and is connected to the ground conductive structure of a cable 1*a* to 1*n* that terminates at the connective structure 8 on another side, this embodiment is merely exemplary. Other connective structures that comprise symmetrical ground paths may also be utilized, for example.

Said another way, various assemblies that include (i) a PCB, (ii) at least one cable that comprises at least one signal conductor and at least one ground conductor, and (iii) a connective structure that is mounted to the PCB and to the at least one ground conductor that terminates on the connective structure, where the connective structure provides at least two substantially symmetric paths from a termination area of the ground conductor to the PCB are part of the instant disclosure.

The inventive cables and connective structures may be a part of inventive assemblies. Referring now to FIG. 8A there is depicted one such inventive assembly 19. As shown the assembly 19 may comprise a module whose top cover 19*a* has been removed to allow the reader to view a PCB 10 (e.g., a paddle card) and inventive cables 1*a* to 1*n*. In an embodiment, inventive cables 1*a* to 1*n* may be connected to the PCB 10, for example, at an end of the assembly 19 using the inventive connection structures described elsewhere herein. Also shown is a movable, connective handle 21 which may be utilized to securely connect/disconnect a cabling cover or enclosure 20 (with inventive cables 1*a* to 1*n* inside) to the module 19 by activating/deactivating a closing mechanism (e.g., a latch) (not shown in FIG. 8A).

Figure 8B:
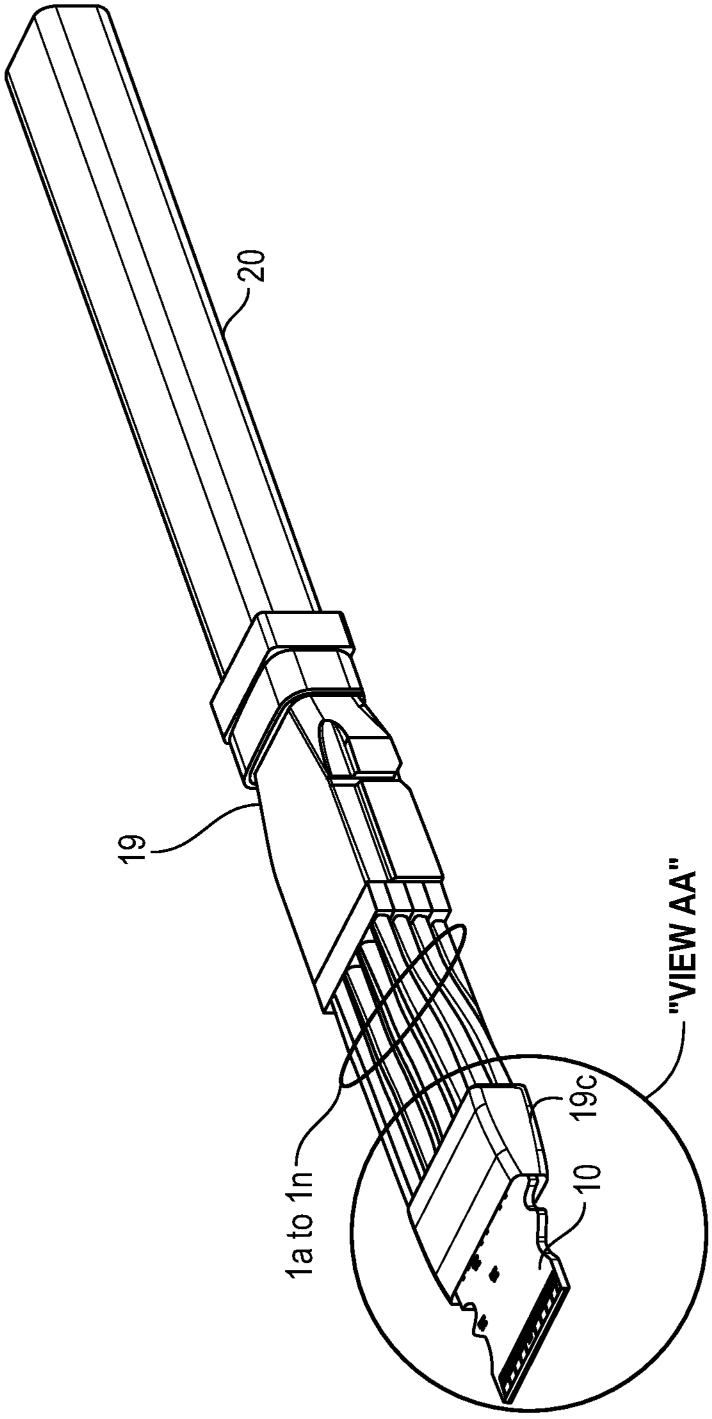
Figure 9A:
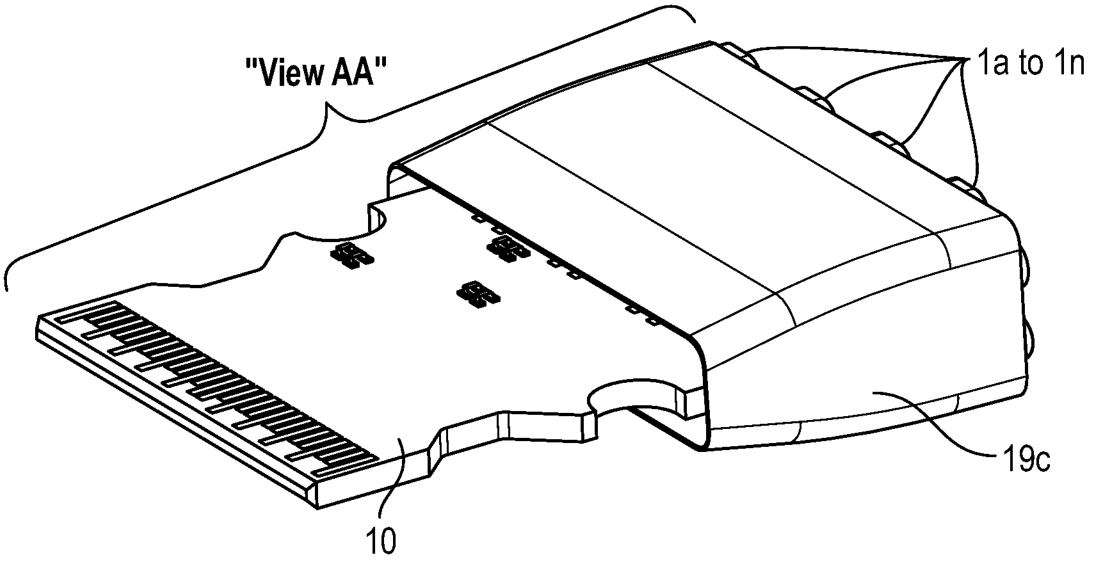
FIGS. 9A and 9B depict enlarged views of a part of the inventive assembly shown in FIGS. 8A and 8B according to embodiments of the invention.
Figure 9B:
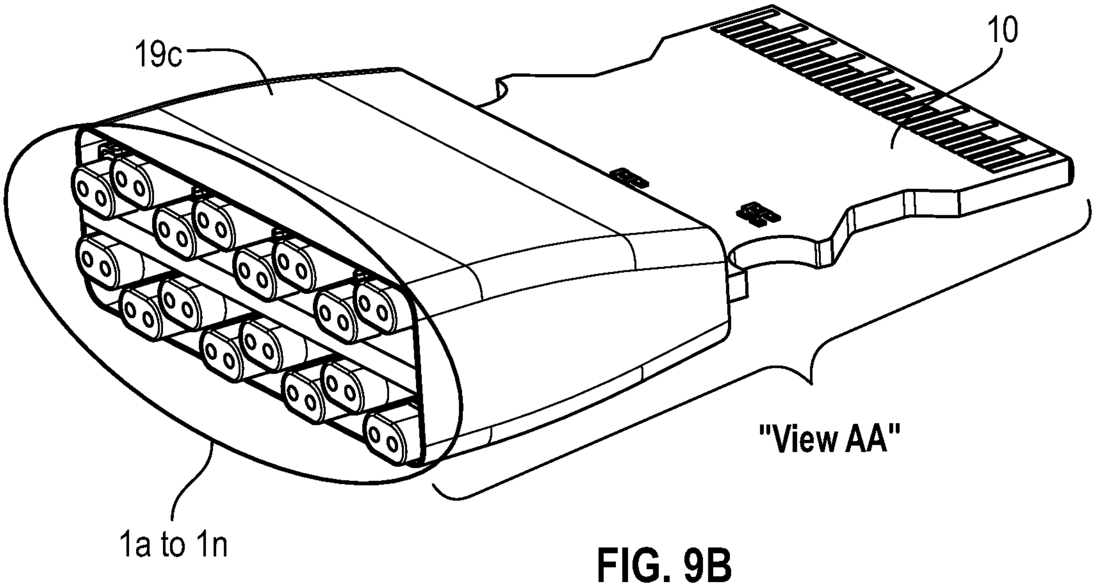

FIG. 8B also depicts a different view of the assembly 19 with the cover 19*a*, side structures 19*b* and handle 21 removed for the sake of clarity. Focus now will turn to the "View AA" circled in FIG. 8B. Enlarged views of "View AA" are shown in FIGS. 9A and 9B (i.e., opposite ends of View AA). As depicted, inventive cables 1*a* to 1*n* may be connected to a PCB 10 (e.g., a paddle card) using connection structures (not shown) within a protective cover 19*c* that may be a part of the assembly 19, for example.

Figure 10A:
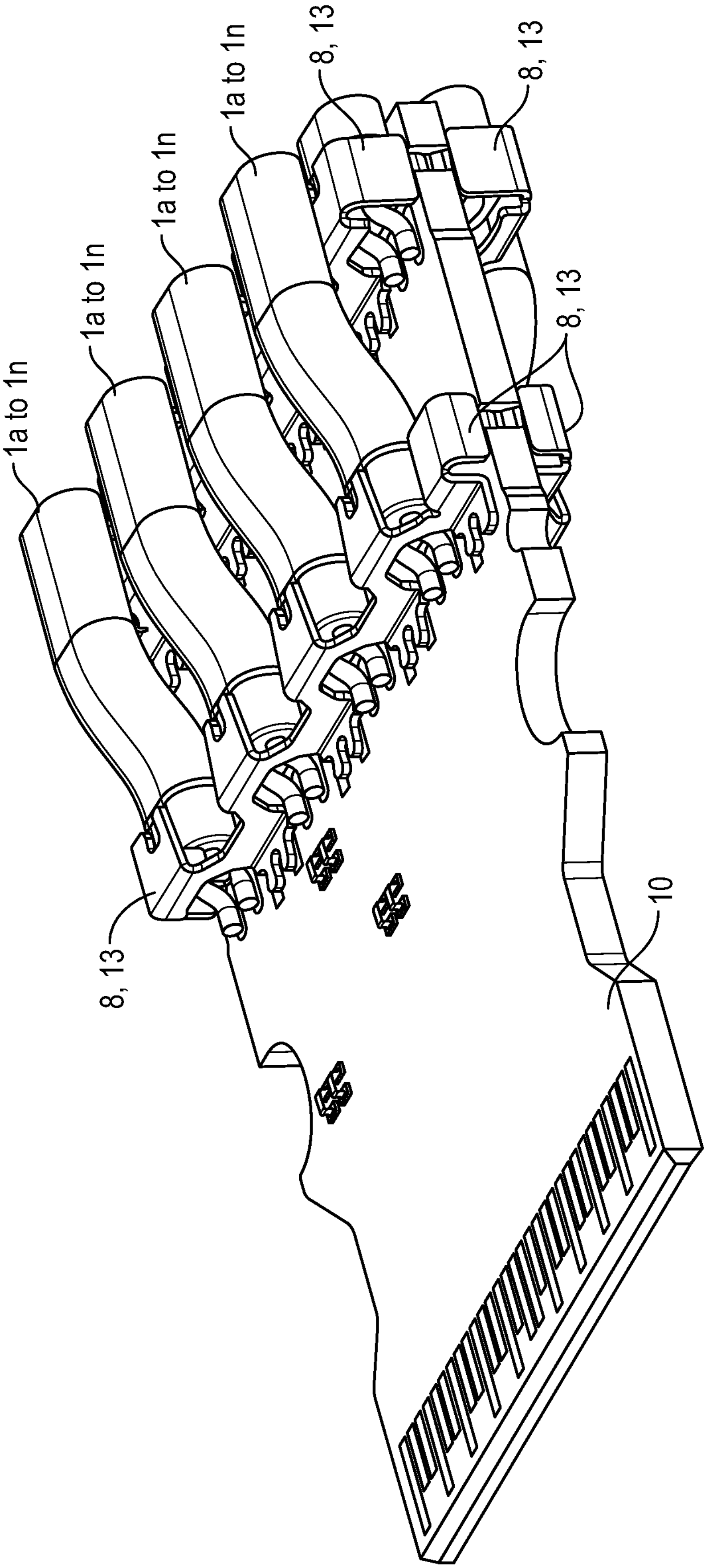
Figure 10B:
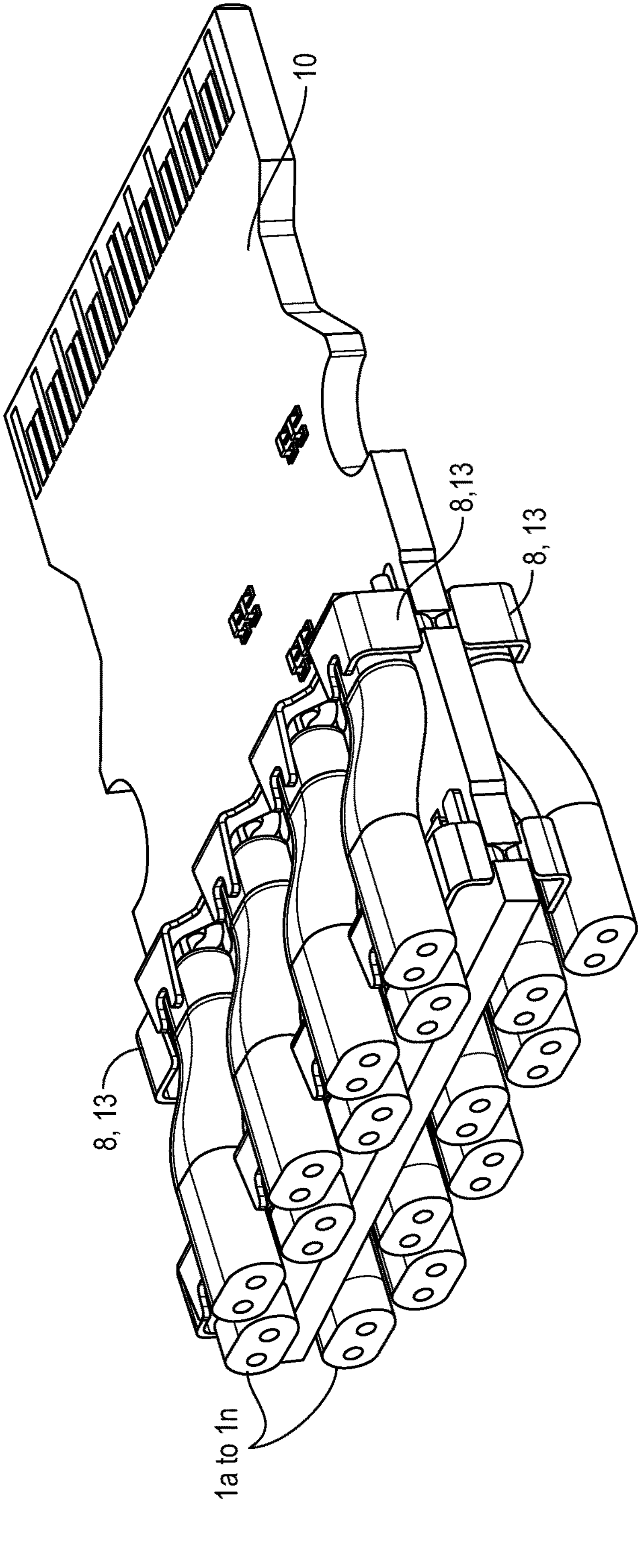
Figure 11A:
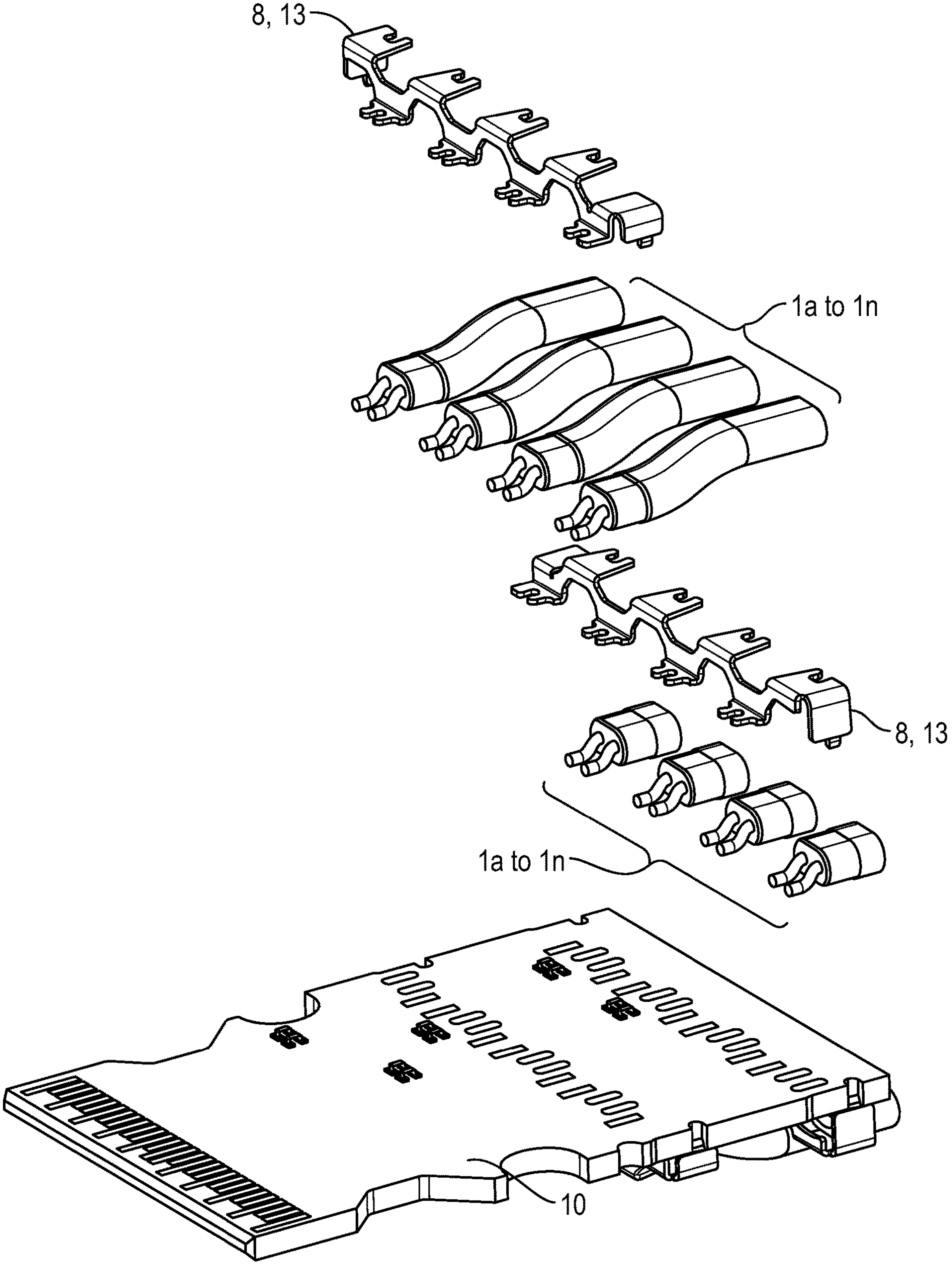
FIGS. 11A and 11B depict exploded views of the connections depicted in FIGS. 10A and 10B according to embodiments of the invention.
Figure 11B:
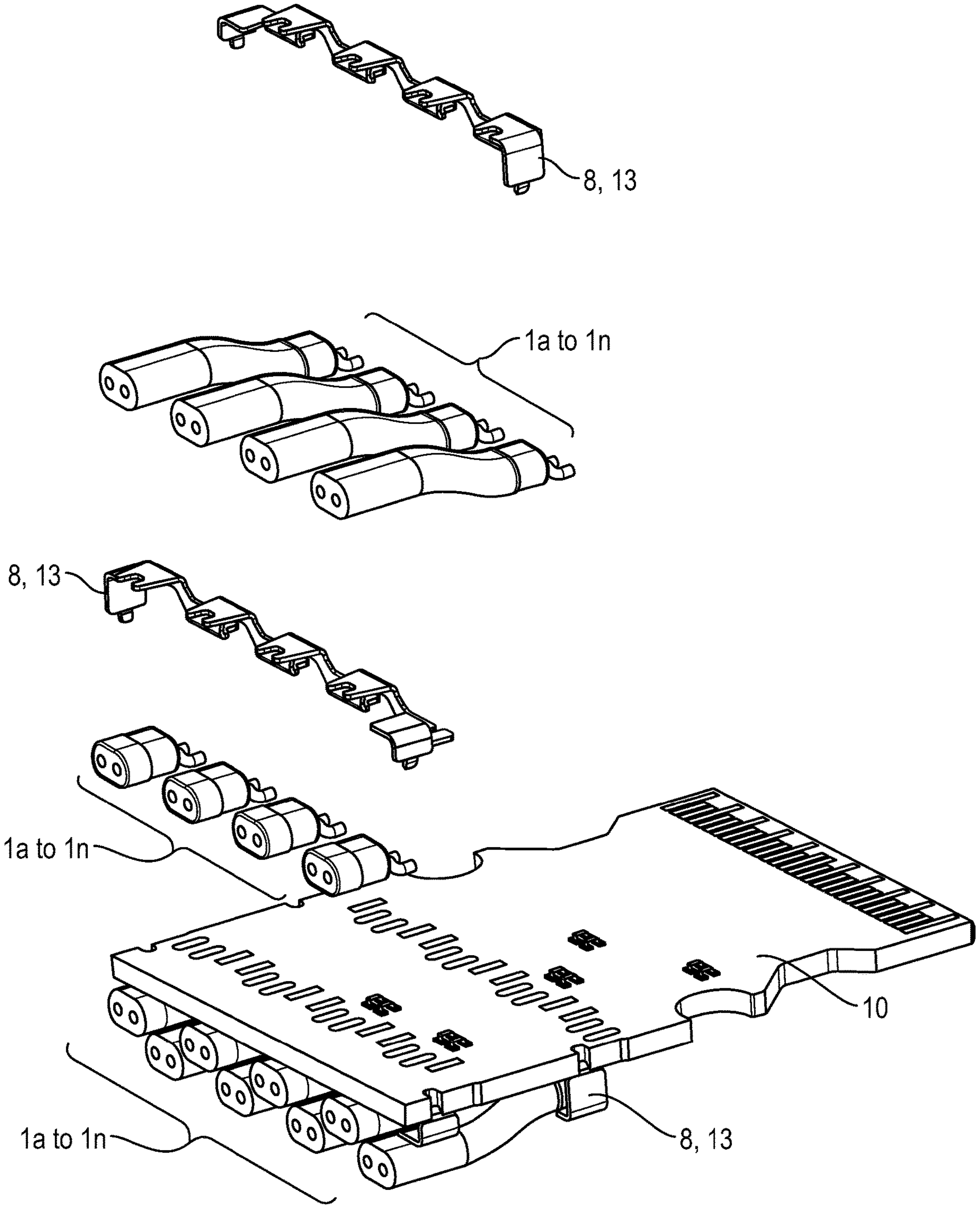
Figure 12A:
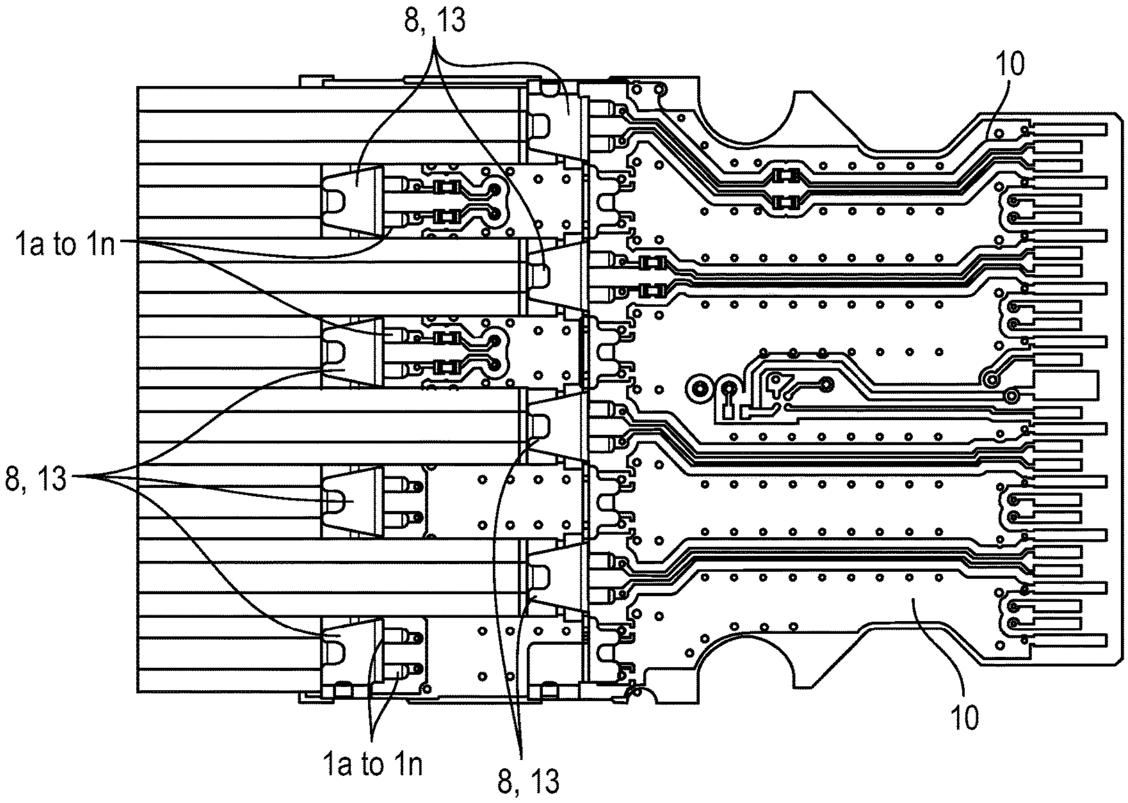
FIGS. 12A to 12C depict different views of a PCB connected to inventive cables according to embodiments of the invention.
Figure 12B:
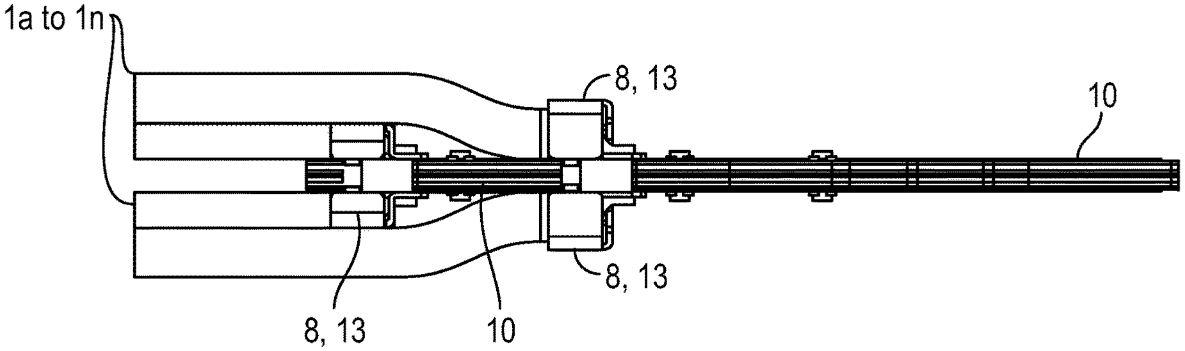
Figure 12C:
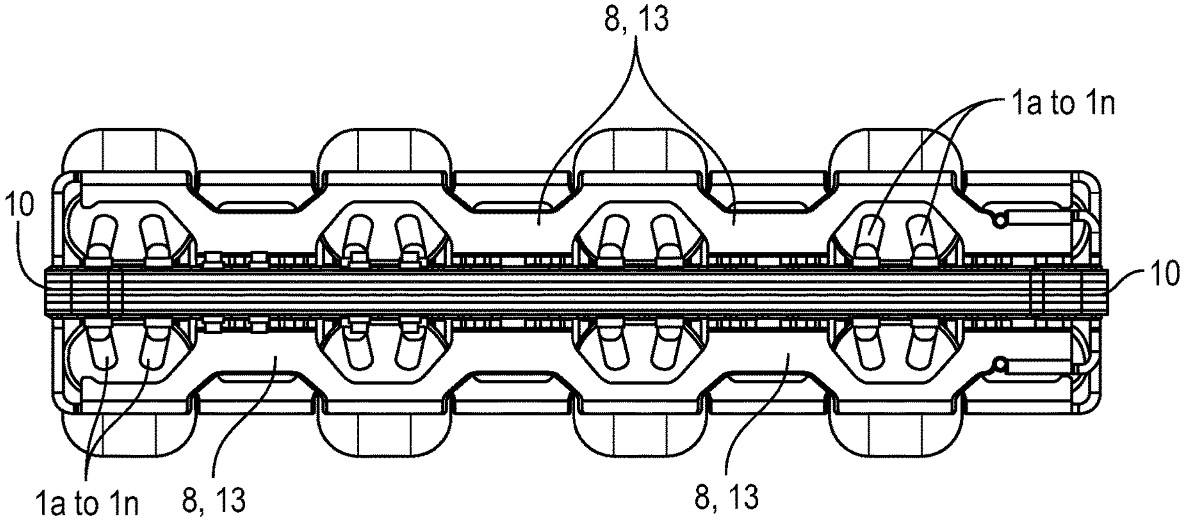

Referring now to FIGS. 10A and 10B the protective cover 19*c* has been removed to allow the reader to view conductive straps (e.g., strap 8 or strap 13) that are part of connection structures to connect the inventive cables 1*a* to 1*n* to the PCB 10. In FIGS. 11A and 11B, exploded views of the connections depicted in FIGS. 10A and 10B are shown. In FIG. 11A, a "TOP" view (i.e., top of the PCB 10) is shown, while in FIG. 11B a "BOTTOM" view of the PCB 10 is shown. The reader will note that inventive cables 1*a* to 1*n* may be connected to both the TOP and BOTTOM of the PCB 10 by inventive connection structures that may include conductive straps 8,13, for example, FIGS. 12A to 12C depict different views of a PCB 10 connected to inventive cables 1*a* to 1*n* by inventive connection structures that may include conductive straps 8, 13 according to embodiments of the invention.

While benefits, advantages, and solutions have been described above with regard to specific embodiments of the present invention, it should be understood that such benefits, advantages, and solutions and any element(s) that may cause or result in such benefits, advantages, or solutions, or cause such benefits, advantages, or solutions to become more pronounced are not to be construed as a critical, required, or an essential feature or element of any or all the claims appended to the present disclosure or that result from the present disclosure.

We claim:

1. An assembly comprising:

a printed circuit board;

a cable comprising a signal conductor and a shield layer surrounding the signal conductor; and a connective structure mounted to the printed circuit board, the connective structure comprising a conductive strap and a pair of supporting structures on each side of the conductive strap, wherein the conductive strap wraps around a portion of the cable and comprises a notch, wherein the notch receives a solder element configured to communicatively couple the conductive strap to the shield layer of the cable, and wherein the pairs of supporting structures are connected with the printed circuit board to form a ground path from the cable to an electrical ground connected with the printed circuit board.

2. The assembly of claim 1, wherein the conductive strap further comprises one or more top conductive elements and one or more bottom conductive elements, and wherein the one or more bottom conductive elements are configured to be coupled to the printed circuit board.

3. The assembly of claim 2, wherein the pairs of supporting structures comprise substantially symmetrical ground paths coupled from the one or more top conductive elements to the one or more bottom conductive elements.

4. The assembly of claim 1, wherein the connective structure couples a pair of cables to a top side of the printed circuit board opposing a bottom side of the printed circuit board or to the bottom side of the printed circuit board.

5. The assembly of claim 1, further comprising a nub or protrusion extending from an end of the cable and into the notch.

6. The assembly of claim 1, wherein the conductive strap of comprises a formable metal, alloy, or any combination thereof.

7. The assembly of claim 1, wherein the conductive strap comprises a thickness of 2 mm.

8. An assembly comprising:

a printed circuit board;

at least one cable comprising at least one signal conductor and a shield layer;

a connective structure mounted over the at least one cable and to the printed circuit board, the connective structure comprising a notch and at least two substantially symmetrical ground paths from the shield layer of the at least one cable to the printed circuit board; and a solder element positioned in the notch to electrically couple the connective structure to the shield layer of the at least one cable.

9. The assembly as in claim 8, wherein the connective structure is configured around an end of the at least one cable.

10. The assembly as in claim 8, wherein pairs of supporting structures of the connective structure a form the at least two substantially symmetrical ground paths path from the connective structure to the printed circuit board.

11. An assembly comprising:

a printed circuit board;

a cable comprising a signal conductor and a shield layer surrounding the signal conductor; and a connective structure mounted to the printed circuit board, the connective structure comprising a conductive strap made of a conductive element and a pair of supporting structures on each side of the conductive strap, wherein the conductive strap is coupled with the cable by a connective element and the supporting structures are coupled with the printed circuit board, and the connective element comprises one or more of:

a solder element configured to form a connection to an outer layer of the cable and the connective structure;

a nub or protrusion extending from an end of the cable into a notch of the connective structure configured to receive the connective element; or any combination thereof.

12. The assembly of claim 11, wherein the conductive strap is physically and electrically coupled to the cable and each supporting structure, and wherein the supporting structures are physically and electrically coupled to the printed circuit board to form a ground path from the cable to an electrical ground connected with the printed circuit board.

13. The assembly of claim 11, wherein the notch receives the connective element configured to electrically and physically couple the conductive strap to the shield layer of the cable.

14. The assembly of claim 11, wherein the pair of supporting structure forms at least two substantially symmetrical ground paths from the conductive strap to the printed circuit board.

15. The assembly of claim 11, wherein the conductive strap comprises a formable metal, alloy, or any combination thereof.

16. The assembly of claim 11, wherein the conductive strap comprises a thickness of .2 mm.

17. The assembly of claim 11, wherein the shield layer comprises one or more outer conductive shield layers composed of a first material composition, one or more inner insulating layers, and one or more inner conductive shield layers composed of a second material composition different than the first material composition.

18. The assembly of claim 1, wherein the shield layer comprises one or more outer conductive shield layers of a first material composition, one or more inner insulating layers, and one or more inner conductive shield layers of a second material composition different than the first material composition.

* * * * *